(12) United States Patent
Kitani

(10) Patent No.: US 11,040,573 B2
(45) Date of Patent: Jun. 22, 2021

(54) TIRE

(71) Applicant: Sumitomo Rubber Industries, Ltd., Kobe (JP)

(72) Inventor: Naofumi Kitani, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 397 days.

(21) Appl. No.: 15/839,582

(22) Filed: Dec. 12, 2017

(65) Prior Publication Data

US 2018/0186193 A1    Jul. 5, 2018

(30) Foreign Application Priority Data

Dec. 29, 2016  (JP) .............................. JP2016-257380
Dec. 29, 2016  (JP) .............................. JP2016-257381

(51) Int. Cl.
*B60C 11/03*  (2006.01)
*B60C 11/12*  (2006.01)

(52) U.S. Cl.
CPC ...... *B60C 11/0309* (2013.01); *B60C 11/0306* (2013.01); *B60C 11/1236* (2013.01); *B60C 11/1281* (2013.01); *B60C 2011/036* (2013.01); *B60C 2011/0346* (2013.01); *B60C 2011/0358* (2013.01); *B60C 2011/0362* (2013.01); *B60C 2011/0381* (2013.01); *B60C 2011/0383* (2013.01); *B60C 2011/1213* (2013.01); *B60C 2200/06* (2013.01)

(58) Field of Classification Search
CPC ......... B60C 2011/0388; B60C 11/0306; B60C 11/12; B60C 11/13
See application file for complete search history.

(56) References Cited

U.S. PATENT DOCUMENTS

| 4,515,197 A | * | 5/1985 | Motomura | .......... B60C 11/0306 |
| | | | | 152/209.21 |
| 2017/0120685 A1 | * | 5/2017 | Hayashi | .............. B60C 11/0306 |

FOREIGN PATENT DOCUMENTS

| CN | 1978225 A | * | 6/2007 | ......... B60C 11/0306 |
| JP | 2005-280457 A | | 10/2005 | |
| JP | 2009-190677 A | | 8/2009 | |
| JP | 2009190677 A | * | 8/2009 | ......... B60C 11/0306 |
| JP | 2009-234362 A | | 10/2009 | |
| JP | 2013001287 A | * | 1/2013 | |
| JP | 2014-15212 A | | 1/2014 | |
| JP | 2014015212 A | * | 1/2014 | |

OTHER PUBLICATIONS

Extended European Search Report for Application No. 17207442.9, dated Apr. 30, 2018.

* cited by examiner

*Primary Examiner* — Steven D Maki
*Assistant Examiner* — Cedrick S Williams
(74) *Attorney, Agent, or Firm* — Birch, Stewart, Kolasch & Birch, LLP

(57) ABSTRACT

A tire includes a tread portion. The tread portion includes two main grooves extending continuously in a tire circumferential direction and a land region defined between the two main grooves. The two main grooves extend in a zigzag manner with phases thereof aligned with each other. The land region is provided with a longitudinal sipe extending in the tire circumferential direction in a zigzag manner with a phase thereof opposite to the phases of the zigzags of the two main grooves.

20 Claims, 12 Drawing Sheets ns of the main grooves and second apex portions convex toward the other one of the main grooves, and the lateral narrow grooves of at least one of the lateral narrow groove pairs are connected with the longitudinal sipe at both sides in the tire circumferential direction of one of the first apex portions or one of the second apex portions.

In another aspect of the invention, it is preferred that at least one of the lateral narrow grooves provided in the first blocks is smoothly connected with one of the lateral narrow grooves provided in the second blocks with the longitudinal sipe therebetween.

In another aspect of the invention, it is preferred that a minimum distance between edges of the two lateral narrow grooves is in a range of from 2.0 to 5.0 mm.

In another aspect of the invention, it is preferred that each of the lateral narrow grooves includes, in a cross-sectional view thereof, an outer portion disposed on a side of the ground contacting surface and an inner portion disposed on an inner side in a tire radial direction of the outer portion and extending with a constant width of less than 1.5 mm.

In another aspect of the invention, it is preferred that each of the lateral narrow grooves has a depth in a range of from 0.60 to 0.70 times a depth of each of the main grooves.

In another aspect of the invention, it is preferred that the lateral narrow grooves have the same depths as that of the longitudinal sipe.

In another aspect of the invention, it is preferred that bending angles of the zigzag of the longitudinal sipe are smaller than bending angles of the zigzags of the main grooves.

In another aspect of the invention, it is preferred that the main grooves include a pair of crown main grooves, one of the pair of the crown main grooves is arranged on one side of a tire equator and the other one of the pair of the crown main grooves is arranged on the other side of the tire equator, the land region includes a crown land region defined between the first crown main groove and the second crown main groove, and the longitudinal sipe includes a crown longitudinal sipe provided in the crown land region.

In another aspect of the invention, it is preferred that the main grooves include a pair of shoulder main grooves each arranged closest to respective one of tread edges and a pair of crown main grooves each arranged on a side of a tire equator of respective one of the shoulder main grooves, the land region includes a middle land region defined between one of the shoulder main grooves and one of the crown main grooves adjacent thereto and the longitudinal sipe includes a middle longitudinal sipe provided in the middle land region.

TIRE

TECHNICAL FIELD

The present invention relates to a tire having excellent on-ice/on-snow performance.

BACKGROUND ART

For example, Japanese unexamined Patent Application Publication No. 2005-280457 (Patent Literature 1) has proposed a tire having land regions divided by a main groove extending straight and a main groove extending in a zigzag manner. The land regions of the tire disclosed in Patent Literature 1 are provided with a narrow groove or a longitudinal sipe extending straight.

However, the tire disclosed in Patent Literature 1 has room for further improvement of the on-ice/on-snow performance.

SUMMARY OF THE INVENTION

The present invention was made in view of the above, and a primary object thereof is to provide a tire having excellent on-ice/on-snow performance.

In one aspect of the present invention, a tire comprises a tread portion comprising two main grooves extending continuously in a tire circumferential direction in zigzag shapes and a land region defined between the two main grooves, wherein phases of the zigzag shapes of the two main grooves are aligned with each other, the land region is provided with a longitudinal sipe extending in the tire circumferential direction in a zigzag shape, and a phase of the zigzag of the longitudinal sipe is opposite to the phases of the zigzags of the two main grooves.

In another aspect of the invention, it is preferred that the land region is provided with a plurality of first lateral grooves extending from the main groove arranged on one side toward the main groove arranged on the other side and terminating within the land region and a plurality of second lateral grooves extending from the main groove arranged on the other side toward the main groove arranged on the one side and terminating within the land region, the longitudinal sipe extends between the first lateral grooves and the second lateral grooves, and the land region includes first blocks divided by the longitudinal sipe and the plurality of the first lateral grooves and second blocks divided by the longitudinal sipe and the plurality of the second lateral grooves.

In another aspect of the invention, it is preferred that each of the first blocks and the second blocks is provided with a plurality of lateral narrow groove pairs composed of two crown lateral narrow grooves completely crossing the entire width of the block.

In another aspect of the invention, it is preferred that each of the first blocks and the second blocks includes a plurality of small block pieces each defined between the two crown lateral narrow grooves of one of the lateral narrow groove pairs, the small block pieces include a first small block piece provided at a center portion in the tire circumferential direction of the first block or the second block, and second small block pieces having greater lengths in the tire axial direction than that of the first small block piece, and each of the first small block pieces provided in the first blocks is adjacent to one of the second small block pieces provided in the second blocks with the longitudinal sipe therebetween.

In another aspect of the invention, it is preferred that the longitudinal sipe includes first apex portions convex toward

DESCRIPTION OF THE PREFERRED EMBODIMENT

An embodiment of the present invention will now be described in conjunction with accompanying drawings.

Figure 1:
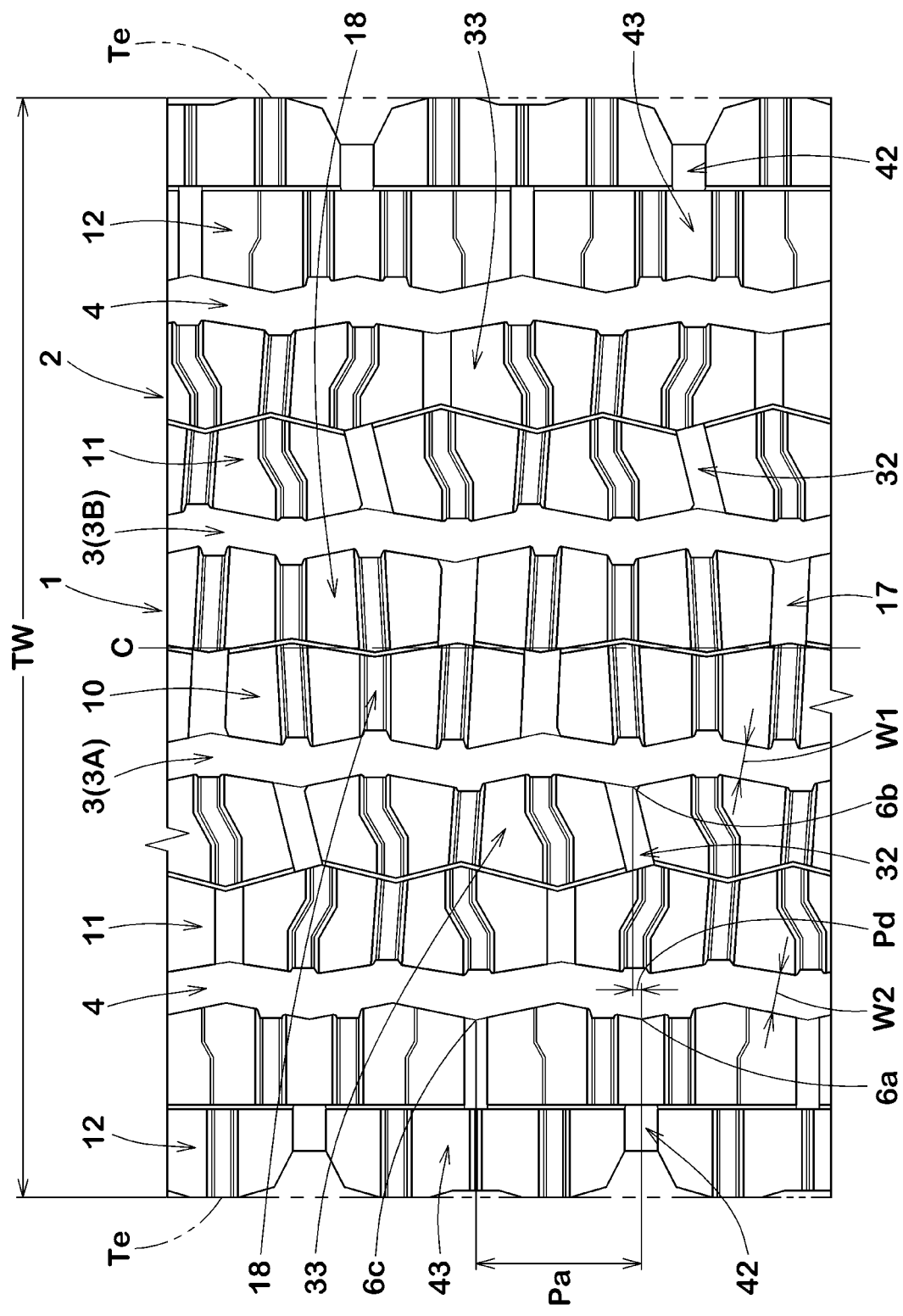
FIG. 1 is a development view of a tread portion of a tire according to an embodiment of the present invention.

FIG. 1 is a development view of a tread portion 2 of a tire 1 showing an embodiment of the present invention. The tire 1 of the present invention can be used for various tires such as, for example, a pneumatic tire for a passenger car and for heavy duty, and a non-pneumatic tire not filled with pressurized air. The tire 1 in this embodiment is, for example, a pneumatic tire and is suitably used as a winter tire for heavy duty.

As shown in FIG. 1, the tread portion 2 is provided with a pair of shoulder main grooves 4 extending continuously in a tire circumferential direction on a side of each of tread edges (Te) and a pair of crown main grooves 3 each extending continuously in the tire circumferential direction on a side of a tire equator (C) of respective one of the shoulder main grooves 4. The shoulder main grooves 4 and the crown main grooves 3 extend in zigzag manners in the tire circumferential direction. The phases of the zigzags of the shoulder main grooves 4 and the crown main grooves 3 are aligned with each other.

The "phase" of a zigzag main groove means a position in one cycle (hereinafter also referred to as "one pitch") of the periodical zigzag pattern of a specific part of the main groove extending periodically in a zigzag manner. One pitch (Pa) is a distance in the tire circumferential direction between vertexes of peak portions adjacent in the tire circumferential direction in one main groove, for example. Further, with respect to the two zigzag-shaped main grooves, "the phases are aligned with each other" means that the peak portions and the valley portions of one of the zigzag-shaped main grooves are at the same positions in the tire circumferential direction with the peak portions and the valley portions of the other one of the zigzag-shaped main grooves. In this case, the phrase "at the same positions" means not only an embodiment in which they are exactly at the same positions but also an embodiment in which a phase difference (Pd) is not greater than 10%, more preferably not greater than 5% of one pitch between the main groove 3 and the main groove 4 adjacent to each other. In view of the fact that the tire is a vulcanization molded product of rubber, this is to allow molding errors. For example, the phase difference (Pd) is defined as a distance in the tire circumferential direction between a vertex (6a) of the peak portion of one main groove and a vertex (6b) of the peak portion of the other main groove positioned closest thereto.

The "tread edges (Te)" are defined as outermost ground contacting positions in a tire axial direction when the tire 1 in a standard state is in contact with a flat surface with zero camber angles by being loaded with a standard tire load. The standard state is a state in which the tire 1 is mounted on a standard rim, inflated to a standard pressure, and loaded with no tire load. In this specification, unless otherwise noted, dimensions and the like of various parts of the tire are values measured in the standard state.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

It is preferred that the crown main grooves are arranged so that a groove center line of each of the crown main grooves 3 is located at a position away from the tire equator (C) by a distance in a range of from 0.08 to 0.15 times a tread width TW, for example. It is preferred that the shoulder main grooves 4 are arranged so that a groove center line of each of the shoulder main grooves 4 is located at a position away from the tire equator (C) by a distance in a range of from 0.25 to 0.35 times the tread width TW, for example. However, the arrangement of the main grooves 3 and 4 is not limited to such ranges. The tread width TW is defined as a distance in the tire axial direction between the tread edges (Te) of the tire 1 in the standard state.

In order to improve steering stability on a dry road surface and the on-ice/on-snow performance in a good balance, it is preferred that a groove width W1 of each of the crown main grooves 3 and a groove width W2 of each of the shoulder main grooves 4 are in a range of from 3% to 7% of the tread width TW, for example. From the same point of view, it is preferred that a groove depth of each of the crown main grooves 3 and the shoulder main grooves 4 is in a range of from 15 to 25 mm in the case of the tire for heavy duty in this embodiment, for example.

Figure 2:
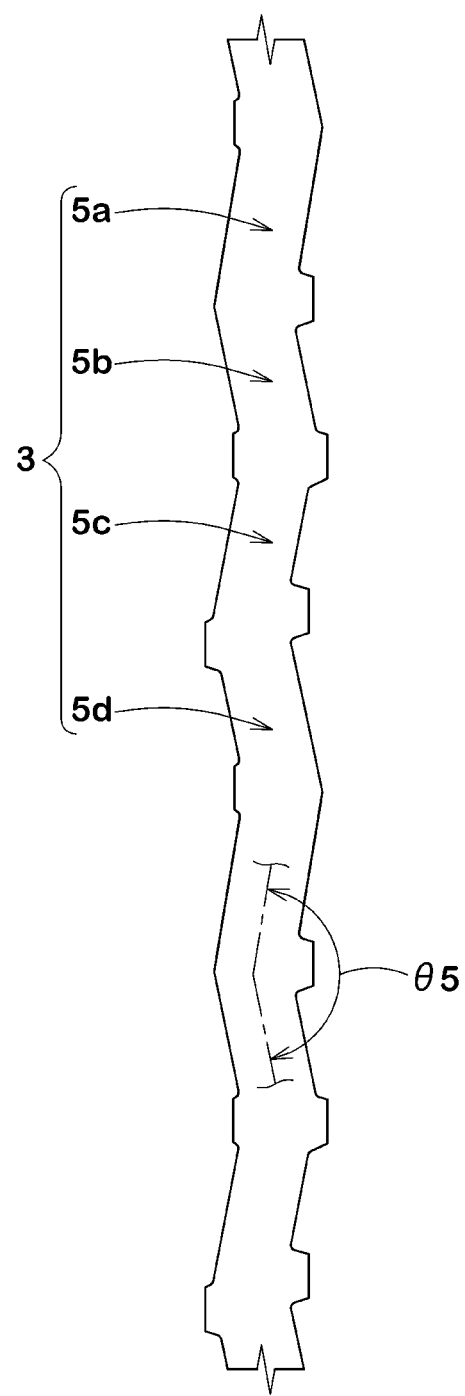
FIG. 2 is an enlarged view of a contour of one of crown main grooves of FIG. 1.

FIG. 2 is an enlarged view of a contour of one of the crown main grooves 3. As shown in FIG. 2, it is preferred that a bending angle θ5 of the crown main groove 3 is in a range of from 160 to 170 degrees, for example.

The crown main groove 3 includes a first groove portion (5a), a second groove portion (5b), a third groove portion (5c), and a fourth groove portion (5d) which are inclined with respect to the tire circumferential direction, for example. The second groove portion (5b) is inclined in the opposite direction to the first groove portion (5a) and is connected with the first groove portion (5a). The third groove portion (5c) is inclined in the opposite direction to the second groove portion (5b) and is connected with the second groove portion (5b). The fourth groove portion (5d) is inclined in the opposite direction to the third groove portion (5c) and is connected with the third groove portion (5c).

Each of the groove portions (5a), (5b), (5c), and (5d) is inclined at an angle in a range of from 5 to 15 degrees, more preferably in a range of from 9 to 12 degrees with respect to the tire circumferential direction, for example. As a more preferred embodiment, each of the groove portions (5a), (5b), (5c) and (5d) in this embodiment is inclined at a different angle (absolute value) from each other with respect to the tire circumferential direction. The crown main grooves 3 configured as such can exert frictional force by edges thereof in many directions.

As a further preferred embodiment, it is preferred that a difference between a maximum inclination angle and a minimum inclination angle of the groove portions (5a), (5b), (5c), and (5d) with respect to the tire circumferential direction is in a range of from 1.0 to 4.0 degrees. The crown main grooves 3 configured as such can increase frictional force in the tire circumferential direction while suppressing uneven wear of the edges thereof.

Figure 3:
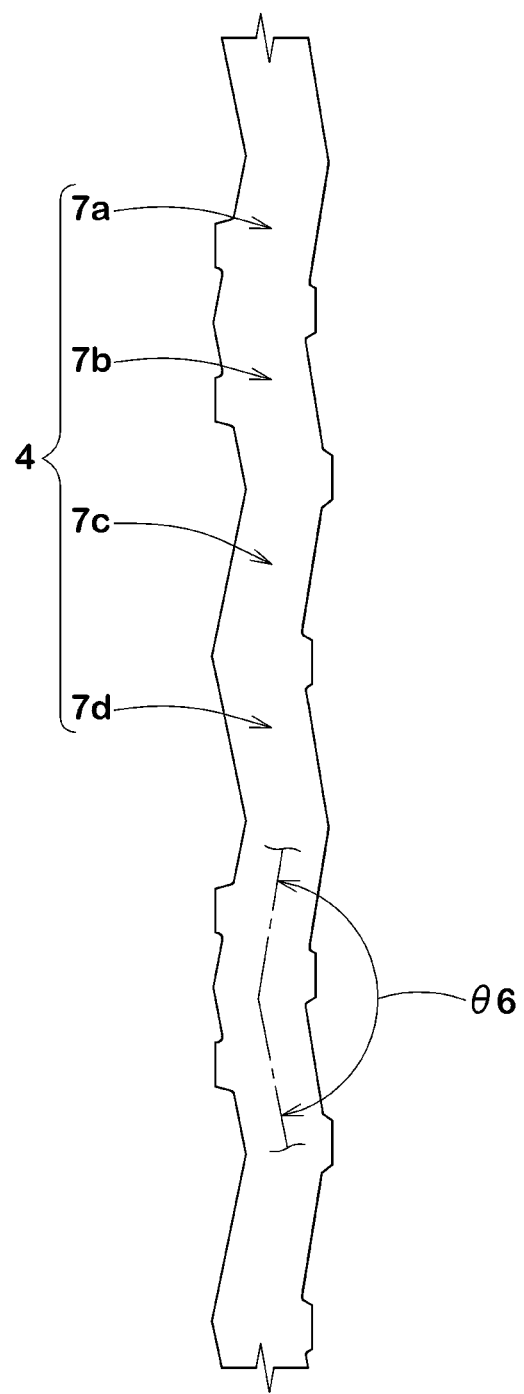
FIG. 3 is an enlarged view of a contour of one of shoulder main grooves of FIG. 1.

FIG. 3 is an enlarged view of a contour of one of the shoulder main grooves 4. As shown in FIG. 3, it is preferred that a bending angle θ6 of the shoulder main groove 4 is in a range of from 160 to 170 degrees, for example.

The shoulder main groove 4 includes a first groove portion (7a), a second groove portion (7b), a third groove portion (7c), and a fourth groove portion (7d) which are inclined with respect to the tire circumferential direction, for example. The second groove portion (7b) is inclined in the opposite direction to the first groove portion (7a) and is connected with the first groove portion (7a). The third groove portion (7c) is inclined in the opposite direction to the second groove portion (7b) and is connected with the second groove portion (7b). The fourth groove portion (7d) is inclined in the opposite direction to the third groove portion (7c) and is connected with the third groove portion (7c).

Each of the groove portions (7a), (7b), (7c), and (7d) is inclined at an angle in a range of from 5 to 15 degrees, more preferably in a range of from 9 to 12 degrees with respect to the tire circumferential direction, for example. As a more preferred embodiment, each of the groove portions (7a), (7b), (7c) and (7d) in this embodiment is inclined at a different angle (absolute value) from each other with respect to the tire circumferential direction. The shoulder main grooves 4 configured as such can exert frictional force by edges thereof in many directions.

As a further preferred embodiment, it is preferred that a difference between a maximum inclination angle and a minimum inclination angle of the groove portions (7a), (7b), (7c), and (7d) with respect to the tire circumferential direction is in a range of from 1.0 to 4.0 degrees. The shoulder main grooves 4 configured as such can increase frictional force in the tire circumferential direction while suppressing uneven wear of the edges thereof.

As shown in FIG. 1, the crown main grooves 3 include a first crown main groove 3A provided on one side of the tire equator (C) and a second crown main groove 3B provided on the other side of the tie equator (C). In FIG. 1, the first crown main groove 3A is provided on the left side of the tire equator (C). The second crown main groove 3B is provided on the right side of tire equator (C).

The first crown main groove 3A and the second crown main groove 3B are arranged so that the phases of the zigzag shapes thereof are aligned with each other. It is preferred that the first crown main groove 3A and the second crown main groove 3B are arranged so that a phase difference between them is not greater than 5% of one pitch, for example. It is more preferred that the first crown main groove 3A and the second crown main groove 3B are arranged so that the phases thereof are completely aligned with each other, that is the phase difference is zero. The first crown main groove 3A and the second crown main groove 3B configured as such can provide frictional forces not only in the tire axial direction but also in the tire circumferential direction, therefore, it is possible that excellent on-ice/on-snow performance is exerted.

The tread portion 2 is provided with a plurality of land regions divided by the crown main grooves 3 and the shoulder main grooves 4. The land regions in this embodiment include a crown land region 10, a pair of middle land regions 11, and a pair of shoulder land regions 12, for example. The crown land region 10 is defined between the first crown main groove 3A and the second crown main groove 3B. Each of the middle land regions 11 is defined between one of the crown main grooves 3 and one of the shoulder main grooves 4 adjacent thereto, for example. Each of the shoulder land regions 12 is defined between one of the shoulder main grooves 4 and one of the tread edges (Te) adjacent thereto, for example.

Figure 4:
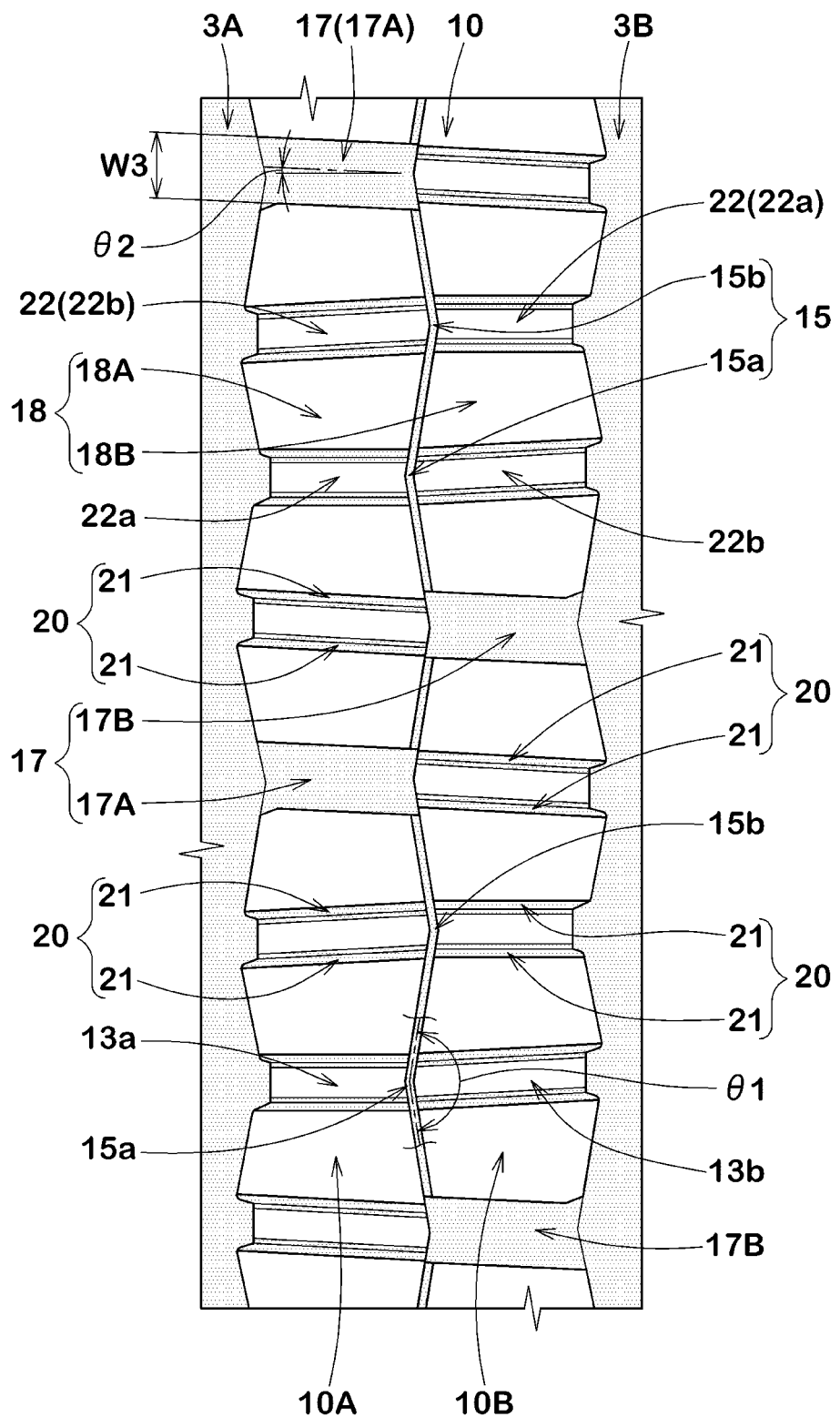
FIG. 4 is an enlarged view of a crown land region of FIG. 1.

FIG. 4 is an enlarged view of the crown land region 10 as an embodiment of the present invention. In FIG. 4, the grooves and sipes are colored in light gray for ease of understanding of the invention. As shown in FIG. 4, the crown land region 10 is defined between the first crown main groove 3A and the second crown main groove 3B in which the phases of the zigzag shapes thereof are aligned with each other, therefore, it is less likely that a width of the crown land region 10 in the tire axial direction varies in the tire circumferential direction. The crown land region 10 configured as such has small deviation of rigidity, therefore, it is possible that damage such as chipping and the like is suppressed.

The crown land region 10 is provided with a crown longitudinal sipe 15 extending in a zigzag manner in the tire circumferential direction. In this specification, "sipe" means a slit having an opening width of less than 1.5 mm at a ground contacting surface of the tire.

The crown longitudinal sipe 15 includes first apex portions (15a) that are convex toward the first crown main groove 3A and second apex portions (15b) that are convex toward the second crown main groove 3B, and these are arranged alternately in the tire circumferential direction. In order to increase frictional force in the tire circumferential direction while suppressing wear of the edges and the chipping of the land region, it is preferred that each of bending angles θ1 of the first apex portions (15a) and the second apex portions (15b) is in a range of from 150 to 170 degrees, more preferably in a range of from 155 to 165 degrees, for example. The bending angles θ1 of the crown longitudinal sipe 15 in this embodiment is smaller than the bending angles θ5 of the crown main grooves 3, for example.

It is preferred that the crown longitudinal sipe 15 has a depth in a range of from 0.60 to 0.70 times those of the crown main grooves 3, for example. The crown longitudinal sipe 15 configured as such can suppress an excessive decrease in rigidity of the crown land region 10.

The phase of the zigzag shape of the crown longitudinal sipe 15 is opposite to the phases of the zigzag shapes of the first crown main groove 3A and the second crown main groove 3B. The phrase "the phases of the zigzag shapes are opposite" means that the peak portions of the main grooves extending in a zigzag manner are aligned in the tire circumferential direction with the valley portions of the longitudinal sipe extending in a zigzag manner. In this embodiment, the phase difference between the zigzag shape of the crown longitudinal sipe 15 and the zigzag shape of the first crown main groove 3A and the phase difference between the zigzag shape of the crown longitudinal sipe 15 and the zigzag shape of the second crown main groove 3B are not greater than 10% of one pitch, for example. It is preferred that the crown longitudinal sipe 15 and the crown main grooves 3A and 3B are arranged so that the phases thereof are completely opposite, (that is the phase difference is 0.5 pitches).

The crown longitudinal sipe 15 configured as such can provide frictional force, by the edges thereof, in different directions from each of the crown main grooves 3A and 3B, therefore, it is possible that excellent on-ice/on-snow performance is obtained.

Further, the crown longitudinal sipe 15 having the zigzag phase opposite to that of each of the crown main grooves 3A and 3B is provided, therefore, small width portions (13a) of a land region piece 10A arranged on one side of the crown longitudinal sipe 15 are adjacent to large width portions (13b) of a land region piece 10b arranged on the other side of the crown longitudinal sipe 15. Thereby, when ground contact pressure is applied to the ground contacting surface, the small width portions are supported by the larger width portions, therefore, excessive deformation of the land region is suppressed, thereby, it is possible that high edge effect is exerted particularly on a road surface covered with hard ice.

The crown land region 10 is provided with a plurality of crown lateral grooves 17 extending from either the first crown main groove 3A or the second crown main groove 3B. It is preferred that the crown lateral grooves 17 in this embodiment are provided at intervals in a range of from 1.5 to 2.5 pitches of the crown main grooves 3, for example, and are provided every two pitches in this embodiment. The crown lateral grooves 17 include a plurality of first crown lateral grooves 17A and a plurality of second crown lateral grooves 17B, for example. The first crown lateral grooves 17A and the second crown lateral grooves 17B in this embodiment are misaligned in the tire circumferential direction.

The first crown lateral grooves 17A extend from the first crown main groove 3A toward the second crown main groove 3B and terminate within the crown land region 10, for example. The second crown lateral grooves 17B extend from the second crown main groove 3B toward the first crown main groove 3A and terminate within the crown land region 10, for example. Note that the crown longitudinal sipe 15 in this embodiment includes segments each extending between a pair of the first crown lateral groove 17A and the second crown lateral groove 17B adjacent to each other in the tire circumferential direction.

The crown lateral grooves 17 extend straight with a constant groove width, for example. It is preferred that each of the crown lateral grooves 17 has a groove width W3 in a range of from 0.9 to 1.1 times of those of the crown main grooves 3, for example. It is preferred that each of the crown lateral grooves 17 has a groove depth in a range of from 0.75 to 0.85 times those of the crown main grooves 3, for example. The crown lateral grooves 17 configured as such can increase wet performance while suppressing damage of the crown land region 10.

It is preferred that each of the crown lateral grooves 17 is arranged at an angle θ2 with respect to the tire axial direction, for example. The angle θ2 is preferably not smaller than 1.0 degree, more preferably not smaller than 2.0 degrees, and preferably not greater than 5.0 degrees, more preferably not greater than 4.0 degrees. The crown lateral grooves 17 configured as such can exert frictional force in the lateral direction as well, therefore, it is possible that sideslip resistance performance on ice and snow is increased. Further, in the crown lateral grooves 17 configured as such, it is likely that ground contacting pressure is applied evenly to the whole edges, therefore, it is useful for suppressing chipping of the edges and the uneven wear as well.

The crown land region 10 includes crown blocks 18 divided by the crown longitudinal sipe 15 and the crown lateral grooves 17. The crown blocks 18 include first crown blocks 18A and second crown blocks 18B, for example. Each of the first crown blocks 18A is defined by the crown longitudinal sipe 15 and a pair of the first crown lateral grooves 17A adjacent to each other, for example. Each of the second crown blocks 18B is defined by the crown longitudinal sipe 15 and a pair of the second crown lateral grooves 17B adjacent to each other, for example.

Figure 5:
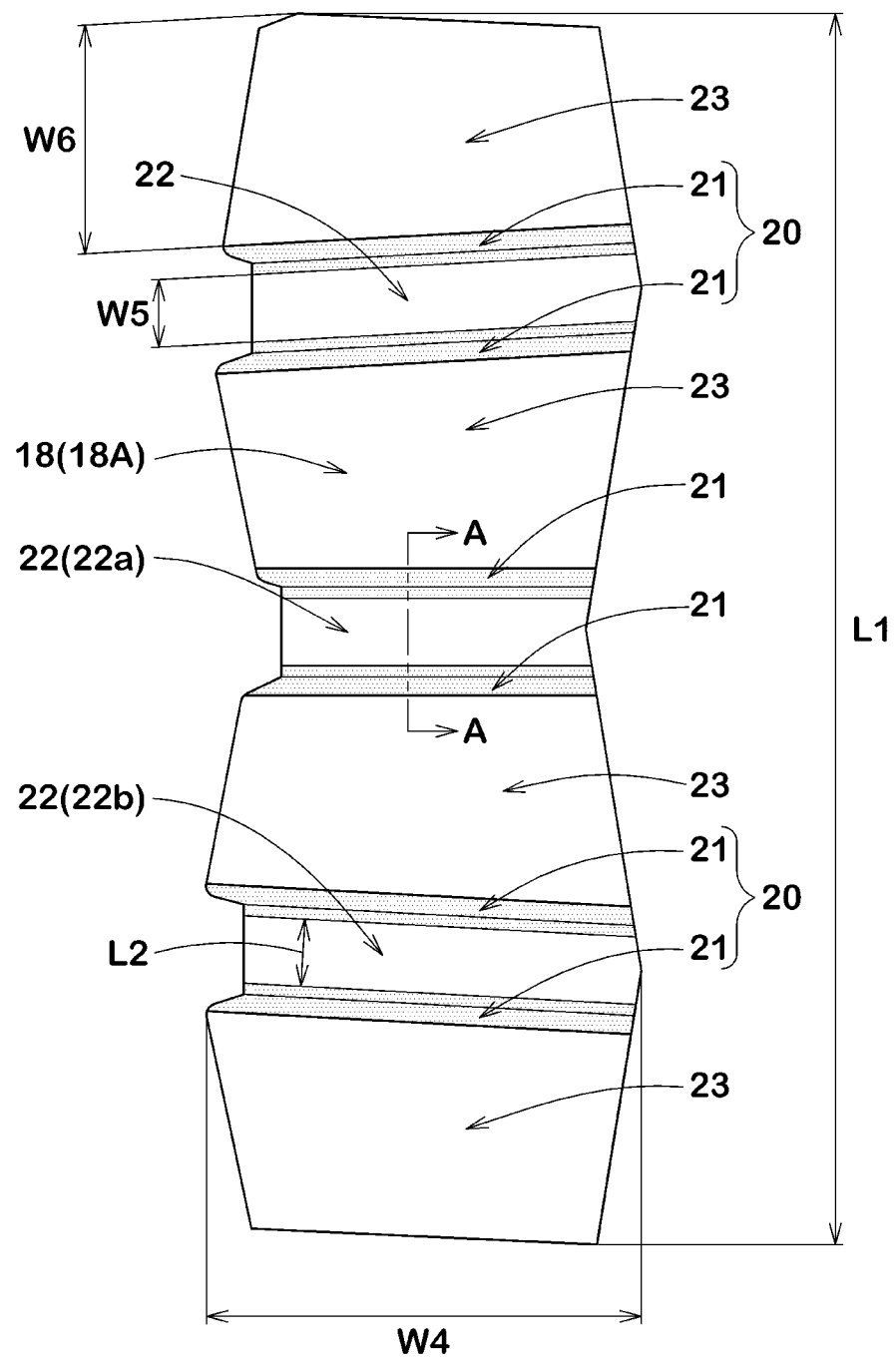
FIG. 5 is an enlarged view of one of first crown blocks of FIG. 1.

FIG. 5 is an enlarged view of one of the first crown blocks 18A as a diagram for explaining the configuration of the crown blocks 18. As shown in FIG. 5, each of the crown blocks 18 has a longitudinally elongated shape in which a length L1 thereof in the tire circumferential direction is larger than a width W4 thereof in the tire axial direction, for example. The crown blocks 18 configured as such have high rigidity in the tire circumferential direction, therefore, it is possible that large traction is exerted on a dry road surface.

It is preferred that the width W4 in the tire axial direction of the crown block 18 is in a range of from 8% to 12% of the tread width TW (shown in FIG. 1 and the same applies below), for example. It is preferred that the length L1 in the tire circumferential direction of the crown block 18 is in a range of from 2.5 to 3.5 times the width W4, for example. The crown blocks 18 configured as such have rigidity in a good balance in the tire circumferential direction and in the tire axial direction, therefore, it is possible that chipping of the blocks and the uneven wear are effectively suppressed.

It is preferred that each of the crown blocks 18 is provided with a plurality of crown lateral narrow groove pairs 20, for example. Each of the crown lateral narrow groove pair 20 is composed of two crown lateral narrow grooves 21 completely crossing the entire block width. Each of the crown blocks 18 in this embodiment is provided with three crown lateral narrow groove pairs 20. Thereby, each of the crown blocks 18 is divided into small block pieces 22 and large block pieces 23 arranged alternately in the tire circumferential direction.

Each of the small block pieces 22 is defined between the two crown lateral narrow grooves 21 of the crown lateral narrow groove pair. Each of the large block pieces 23 is defined between one of the crown lateral grooves 17 and its adjacent crown lateral narrow groove pair 20 or between the crown lateral narrow groove pairs 20 adjacent in the tire circumferential direction. The large block pieces 23 have widths in the tire circumferential direction larger than those of the small block pieces 22. A maximum width W6 in the tire circumferential direction of the large block piece 23 is 2.5 to 3.5 times a width W5 of the small block piece 22, for example.

With such an arrangement of the small block pieces 22 and the large block pieces 23, the small block pieces 22 are supported by the large block pieces 23, therefore, it is possible that excessive deformation of the crown blocks 18 is suppressed. Thereby, it is possible to arrange the crown lateral narrow grooves 21 more, therefore, it is possible that excellent on-ice/on-snow performance is obtained.

As shown in FIG. 4, in a preferred embodiment, the small block pieces 22 of each of the crown blocks 18 include a first small block piece (22a) provided at a center portion in the tire circumferential direction of the first crown block 18A or the second crown block 18B, and second small block pieces (22b) having greater lengths in the tire axial direction than that of the first small block piece (22a). It is preferred that the first small block piece (22a) provided in each of the first crown blocks 18A is adjacent to one of the second small block pieces (22b) provided in the second crown blocks 18B with the crown longitudinal sipe 15 therebetween. Similarly, it is preferred that the first small block piece (22a) provided in each of the second crown blocks 18B is adjacent to one of the second small block pieces (22b) provided in the first crown blocks 18A with the crown longitudinal sipe 15 therebetween.

With such an arrangement of the small block pieces 22, the second small block pieces (22b) support the first small block pieces (22a) so as to suppress collapse of the first small block pieces (22a) in the tire axial direction, therefore, excessive deformation of the land region is suppressed, thereby, excellent steering stability on a dry road surface is obtained.

As shown in FIG. 5, in a more preferred embodiment, it is preferred that side walls of the small block pieces 22 on sides of the main grooves 3 are recessed more than side walls of the large block pieces 23. Thereby, it is possible that snow is firmly pressed together in the main grooves 3 during running on snow, therefore, large snow shearing force is obtained.

Each of the crown lateral narrow groove pairs 20 is composed of two crown lateral narrow grooves 21 extending in the same direction, for example, and in a more preferred embodiment, it is composed of two crown lateral narrow grooves 21 extending in parallel with each other.

A minimum distance L2 between edges of the two crown lateral narrow grooves 21 is preferably not less than 2.0 mm, more preferably not less than 2.5 mm, and preferably not more than 5.0 mm, more preferably not more than 4.5 mm. Thereby, the two crown lateral narrow grooves 21 are moderately spaced apart from each other, therefore, it is possible that occurrence of bareness and the like during vulcanization molding is suppressed. Further, the crown lateral narrow groove pairs 20 configured as such secure the widths of the large block pieces 23 appropriately, therefore, it is possible that chipping and the uneven wear of the blocks are suppressed.

Each of the crown lateral narrow grooves 21 is formed so as to have a width not more than 3 mm, preferably not more than 2.5 mm, for example. The crown lateral narrow grooves 21 may be formed as sipes, for example.

Figure 6:
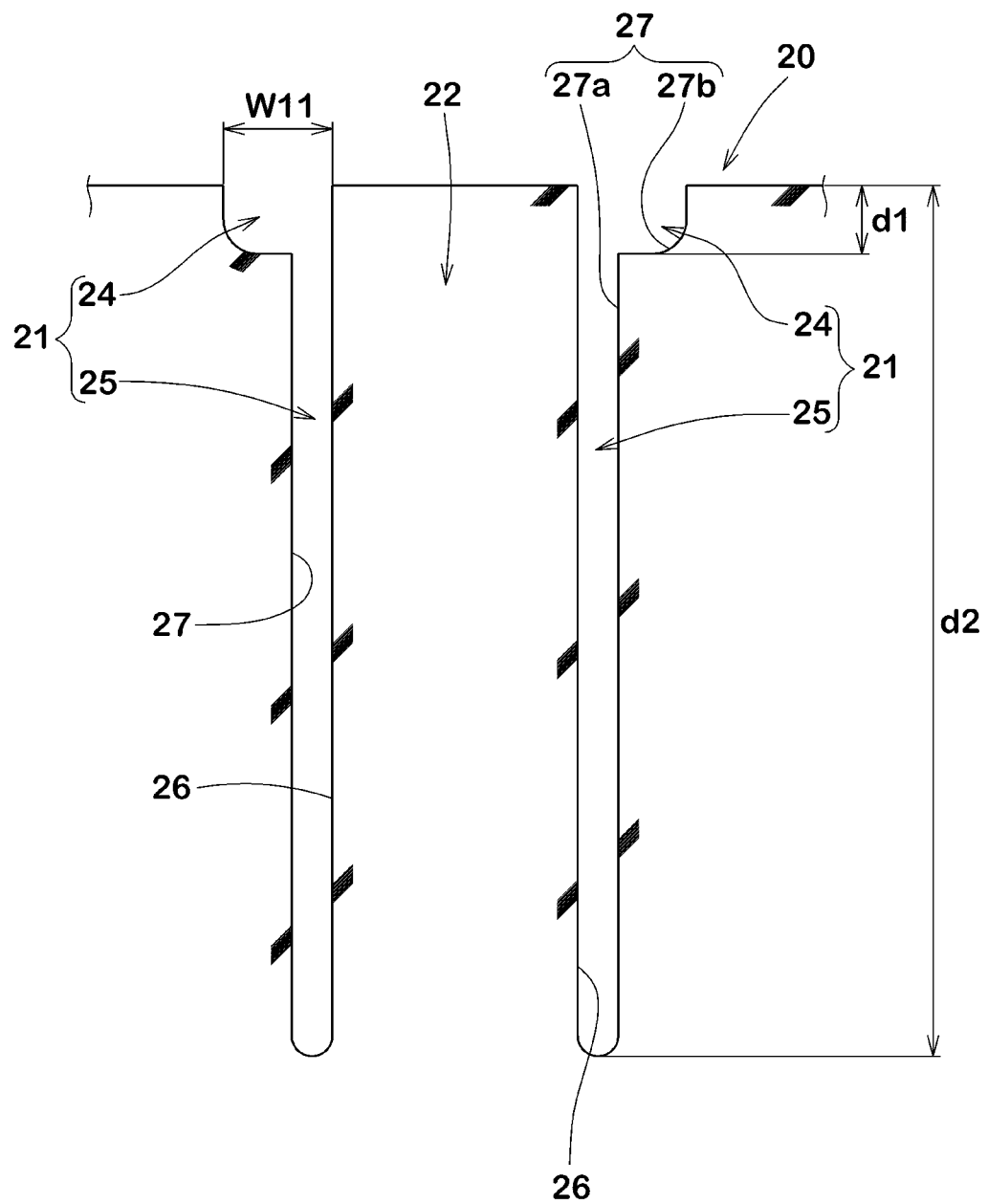
FIG. 6 is a cross-sectional view taken along A-A line of FIG. 5.

FIG. 6 is a cross-sectional view of one of the crown lateral narrow groove pairs 20 taken along A-A line of FIG. 5. As shown in FIG. 6, in the cross section, at least one, preferably each, of the crown lateral narrow grooves 21 includes an outer portion 24 disposed on a side of the ground contacting surface and an inner portion 25 disposed on an inner side in a tire radial direction of the outer portion 24.

The outer portion 24 has an opening width W11 in a range of from 1.5 to 2.5 mm, for example. The outer portion 24 has a depth (d1) in a range of from 0.5 to 1.5 mm, for example. It is preferred that the inner portion 25 extends with a constant width of less than 1.5 mm, for example. The outer portions 24 and the inner portions 25 configured as such can provide large frictional force by edges thereof while maintaining rigidity of the crown blocks 18. Note that the crown lateral narrow grooves 21 are not limited to such an embodiment, and may be configured to extend with a constant width from the ground contacting surface to bottom portions thereof, for example.

Each of the crown lateral narrow grooves 21 in this embodiment has a first wall surface 26 and a second wall surface 27, for example. The first wall surface 26 extends straight from the bottom of the crown lateral narrow groove 21 to the ground contacting surface in the cross section. The second wall surface 27 includes a first portion (27a) extending straight in the tire radial direction to form the inner portion 25 and a second portion (27b) connected with a radially outer end of the first portion (27a) and extending radially outwardly with an increasing groove width so as to form the outer portion 24.

In a preferred embodiment, the first wall surfaces 26 of the crown lateral narrow grooves 21 in one crown lateral narrow groove pair 20 are arranged on each side of the small block piece 22 arranged therebetween. Thereby, side surfaces of the small block pieces 22 are formed in a planar shape, therefore, it is possible that durability of the small block pieces 22 is improved.

It is preferred that each of the crown lateral narrow grooves 21 has a depth (d2) in a range of from 0.60 to 0.70 times that of the first crown main groove 3A, for example. In a more preferred embodiment, the crown lateral narrow grooves 21 have the same depths as that of the crown longitudinal sipe 15. The crown lateral narrow grooves 21 configured as such can improve the steering stability on a dry road surface and the on-ice/on-snow performance in a good balance.

As shown in FIG. 4, it is preferred that at least one of the crown lateral narrow groove pairs 20 is connected with one of the first apex portions (15a) or one of the second apex portions (15b) of the crown longitudinal sipe 15 on both sides thereof in the tire circumferential direction. More specifically, it is preferred that one of the crown lateral narrow grooves 21 of the at least one of the crown lateral narrow groove pairs 20 is connected with the crown longitudinal sipe 15 on one side in the tire circumferential direction of the vertex of one of the first apex portions (15a) or one of the second apex portions (15b), and the other one of the crown lateral narrow grooves 21 of the at least one of the crown lateral narrow groove pairs 20 is connected with the crown longitudinal sipe 15 on the other side in the tire circumferential direction of the above vertex.

It is preferred that at least one of the crown lateral narrow grooves 21 provided in the first crown blocks 18A is smoothly connected with the crown lateral narrow groove 21 provided in the second crown blocks 18B with the crown longitudinal sipe 15 therebetween. A plurality of the crown lateral narrow grooves 21 are smoothly connected, thus, the land region deforms appropriately, therefore, it is easy for each of edges thereof to uniformly contact with the ground, thereby, the on-ice/on-snow performance is further improved.

More than half of the plurality of the crown lateral narrow grooves 21 provided in one first crown blocks 18A in this embodiment are smoothly connected with the crown lateral narrow grooves 21 provided in the second crown blocks 18B.

It is preferred that at least one of the crown lateral narrow grooves 21 is connected with the crown lateral groove 17. Such an arrangement of the crown lateral narrow grooves 21 can provide high frictional force together with the edges of the crown lateral grooves 17. Further, by such an arrangement of the crown lateral narrow grooves 21, snow in the crown lateral grooves 17 is easily discharged by movement of the small block pieces 22, therefore, it is possible that decrease in the on-ice/on-snow performance due to clogging of snow is suppressed.

Figure 7:
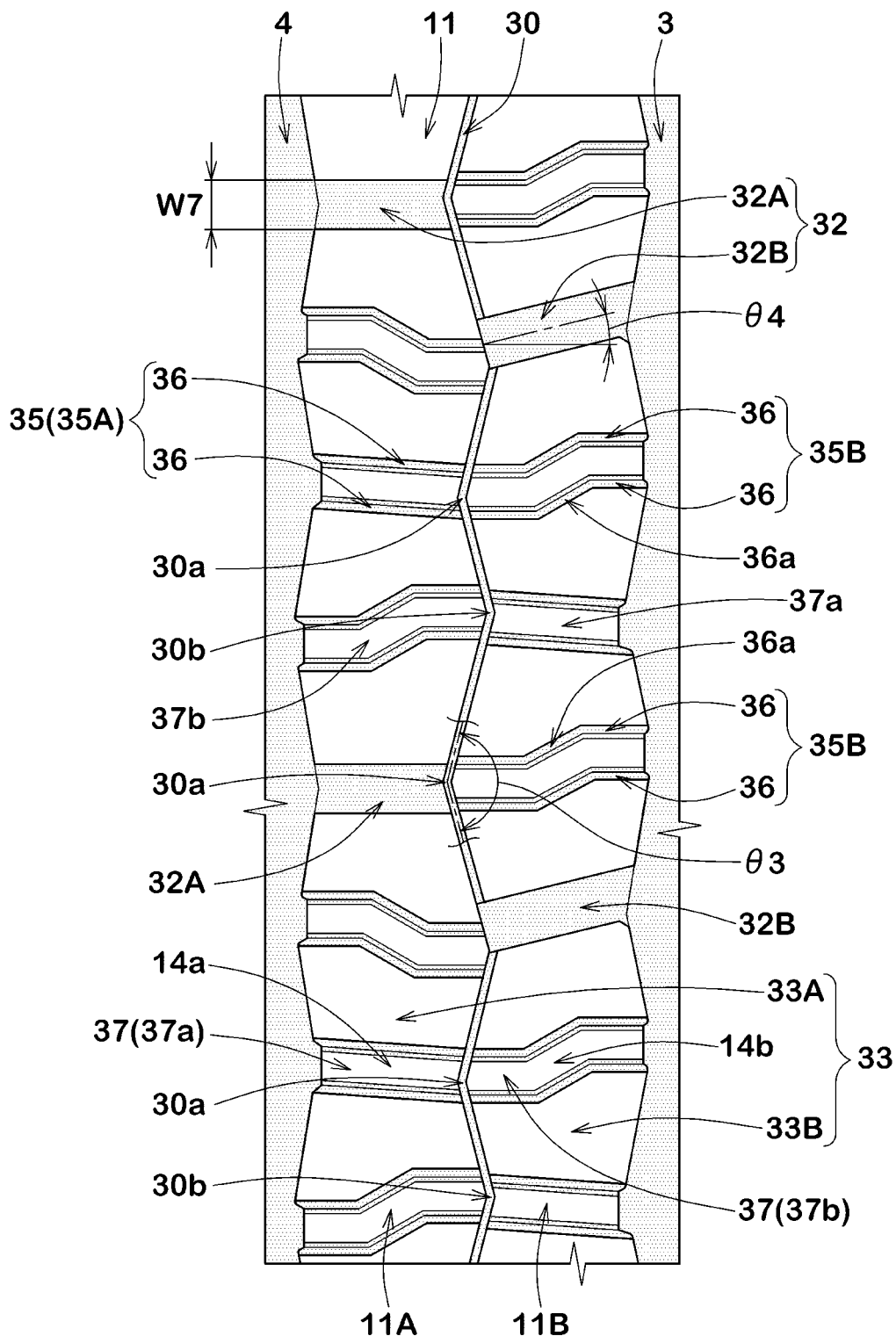
FIG. 7 is an enlarged view of one of middle land regions of FIG. 1.

FIG. 7 is an enlarged view of one of the middle land regions 11 as an example of the land region of the present invention. In FIG. 7, grooves and sipes are colored in light gray for ease of understanding of the invention. As shown in FIG. 7, each of the middle land regions 11 is provided with a middle longitudinal sipe 30 extending in a zigzag manner.

The middle longitudinal sipe 30 includes first apex portions (30a) which are convex toward the shoulder main groove 4 and second apex portions (30b) which are convex toward the crown main groove 3, and these are arranged alternately in the tire circumferential direction. It is preferred that bending angles θ3 of the first apex portions (30a) and the second apex portions (30b) of the middle longitudinal sipe 30 are smaller than the bending angles θ1 (shown in FIG. 4) of the crown longitudinal sipe 15, for example. Specifically, the bending angles θ3 of the zigzag of the middle longitudinal sipe 30 is preferably in a range of from 140 to 160 degrees, more preferably in a range of from 145 to 155 degrees, for example. The bending angles θ3 of the zigzag of the middle longitudinal sipe 30 in this embodiment are smaller than the bending angles θ6 (shown in FIG. 3) of the zigzag of the shoulder main groove 4, for example. The middle longitudinal sipe 30 configured as such is useful for increasing frictional force in the tire circumferential direction while suppressing wear of edges and chipping of the land region.

It is preferred that the middle longitudinal sipe 30 has a depth in a range of from 0.55 to 0.65 times those of the shoulder main grooves 4, for example. The middle longitudinal sipe 30 configured as such can suppress excessive decrease in rigidity of the middle land regions 11. Further, it is preferred that the middle longitudinal sipe 30 has a smaller depth than that of the crown longitudinal sipe 15, for example. Specifically, it is preferred that the middle longitudinal sipe 30 has a depth in a range of from 0.85 to 0.98 times that of the crown longitudinal sipe 15. Thereby, the crown land region 10 and the middle land regions 11 are likely to wear uniformly.

A phase of the zigzag shape of the middle longitudinal sipe 30 is opposite to the phases of the shoulder main groove 4 and the crown main groove 3, for example. The middle longitudinal sipe 30 configured as such can provide frictional force in different directions from the shoulder main groove 4 and the crown main groove 3, therefore, excellent on-ice performance is obtained. Further, in such middle land regions 11 divided by the shoulder main grooves 4, the crown main grooves 3, and the middle longitudinal sipe 30, excessive deformation is suppressed as is the case with the crown land region 10, therefore, it is possible that high edge effect is exerted on a road surface covered with hard ice.

Further, the middle longitudinal sipe 30 having the zigzag phase opposite to those of the shoulder main grooves 4 and the crown main grooves 3 is provided, therefore, small width portions (14a) of a land region piece 11A arranged on one side of the middle longitudinal sipe 30 are adjacent to large width portions (14b) of a land region piece 11B arranged on the other side of the middle longitudinal sipe 30. Thereby, when ground contact pressure is applied to the ground contacting surface, the small width portions (14a) are supported by the larger width portions (14b), therefore, excessive deformation of the land region is suppressed, thereby, it is possible that high edge effect is exerted particularly on a road surface covered with hard ice.

Each of the middle land regions 11 is provided with a plurality of middle lateral grooves 32 extending from the shoulder main groove 4 or the crown main groove 3, for example. It is preferred that the middle lateral grooves 32 in this embodiment are provided every 1.5 to 2.5 pitches of the shoulder main grooves 4 or the crown main grooves 3, for example, and particularly every two pitches in this embodiment. The middle lateral grooves 32 include a plurality of first middle lateral grooves 32A and a plurality of second middle lateral grooves 32B, for example. The first middle lateral grooves 32A and the second middle lateral grooves 32B are misaligned in the tire circumferential direction, for example.

The first middle lateral grooves 32A extend from the shoulder main groove 4 toward the crown main groove 3 and terminate within the middle land region 11, for example. The second middle lateral grooves 32B extend from the crown main groove 3 toward the shoulder main groove 4 and terminate within the middle land region 11, for example. Note that the middle longitudinal sipe 30 in this embodiment includes segments each extending between one of the first middle lateral grooves 32A and one of the second middle lateral grooves 32B adjacent thereto.

Each of the middle lateral grooves 32 extends straight with a constant groove width, for example. It is preferred that the middle lateral grooves 32 have groove widths smaller than those of the crown lateral grooves 17 (shown in FIG. 4), for example. It is preferred that each of the middle lateral grooves 32 in this embodiment has a groove width W7 in a range of from 0.80 to 0.90 times that of the crown lateral groove 17, for example. Thereby, the crown land region 10 and the middle land regions 11 are likely to wear uniformly.

From a similar point of view, it is preferred that the middle lateral grooves 32 have groove depths smaller than those of the crown lateral grooves 17, for example. It is preferred that the middle lateral grooves 32 in this embodiment have groove depths in a range of from 0.90 to 0.98 times those of the crown lateral grooves 17, for example. Further, it is preferred that the middle lateral grooves 32 have groove depths in a range of from 0.70 to 0.80 times those of the shoulder main grooves 4, for example.

It is preferred that the first middle lateral grooves 32A are arranged at angles not more than 10 degrees with respect to the tire axial direction, for example. The first middle lateral grooves 32A in this embodiment extend along the tire axial direction.

It is preferred that each of the second middle lateral grooves 32B is arranged at an angle θ4 larger than the first middle lateral grooves 32A with respect to the tire axial direction, for example. The angle θ4 is preferably not less than 10 degrees, more preferably not less than 12 degrees, and preferably not more than 20 degrees, more preferably not more than 18 degrees. The second middle lateral grooves 32B configured as such exerts frictional force in the lateral direction as well, therefore, it is possible that the sideslip resistance performance on ice and snow is improved. In the crown lateral grooves 17 configured as such, it is likely that ground contact pressure is applied evenly to the whole edges, therefore, it is useful for suppressing chipping of the edges and the uneven wear as well.

Each of the middle land regions 11 includes middle blocks 33 divided by the middle longitudinal sipe 30 and the middle lateral grooves 32, for example. The middle blocks 33 include first middle blocks 33A and second middle blocks 33B, for example. Each of the first middle blocks 33A is defined by the middle longitudinal sipe 30 and a pair of the first middle lateral grooves 32A, for example. Each of the second middle blocks 33B is defined by the middle longitudinal sipe 30 and a pair of the second middle lateral grooves 32B, for example.

Figure 8:
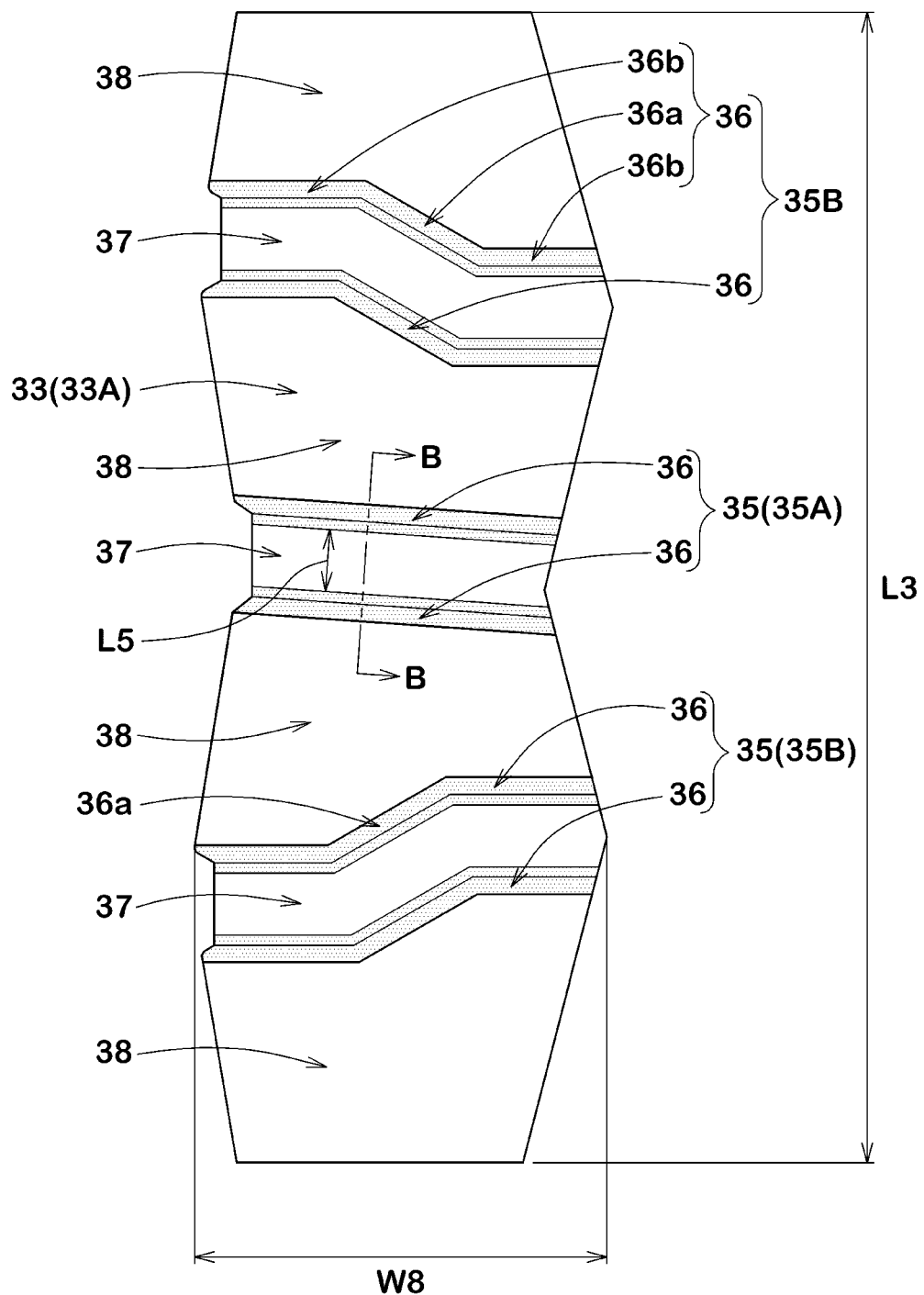
FIG. 8 is an enlarged view of one of first middle blocks of FIG. 7.

FIG. 8 is an enlarged view of one of the first middle blocks 33A as a diagram for explaining the configuration of the middle blocks 33. As shown in FIG. 8, the middle block 33 has a longitudinally elongated shape in which a length L3 in the tire circumferential direction is larger than a width W8 in the tire axial direction, for example.

It is preferred that the width W8 in the tire axial direction of each of the middle blocks 33 is in a range of from 8% to 12% of the tread width TW, for example. It is preferred that the length L3 in the tire circumferential direction of each of the middle blocks 33 is in a range of from 2.5 to 3.5 times the width W8, for example. The middle blocks 33 configured as such have good rigidity balance in the tire circumferential direction and in the tire axial direction, therefore, it is possible that chipping of the blocks and the uneven wear are suppressed effectively.

It is preferred that each of the middle blocks 33 is provided with a plurality of middle lateral narrow groove pairs 35, for example. Each of the middle lateral narrow groove pairs 35 is composed of two middle lateral narrow grooves 36 completely crossing the entire block width. The middle lateral narrow grooves 36 have substantially the same configuration as the crown lateral narrow grooves 21 (shown in FIG. 6) in a cross section thereof. At least one, preferably each, of the middle blocks in this embodiment is provided with three middle lateral narrow groove pairs 35. Thereby, at least one, preferably each, of the middle blocks 33 is provided with small block pieces 37 and large block pieces 38 arranged alternately in the tire circumferential direction.

Each of the small block pieces 37 is defined between the two middle lateral narrow grooves 36 of the middle lateral narrow groove pair. Each of the large block pieces 38 is defined between one of the middle lateral grooves 32 and its adjacent one of the middle lateral narrow groove pairs 35 or between the middle lateral narrow groove pairs 35 adjacent in the tire circumferential direction. The large block pieces 38 have widths in the tire circumferential direction larger than those of the small block pieces 37. Like the crown blocks 18, in the middle blocks 33 provided with the small block pieces 37 and the large block pieces 38 configured as such, excessive deformation of the middle blocks 33 is suppressed.

As shown in FIG. 7, in a preferred embodiment, the small block pieces 37 of each of the middle blocks 33 include a first small block piece (37a) provided at a center portion in the tire circumferential direction of the first middle block 33A or the second middle block 33B, and second small block pieces (37b) having greater lengths in the tire axial direction than that of the first small block piece (37a). It is preferred that the first small block piece (37a) provided in each of the first middle blocks 33A is adjacent to one of the second small block pieces (37b) provided in the second middle blocks 33B with the middle longitudinal sipe 30 therebetween. Similarly, it is preferred that the first small block piece (37a) provided in each of the second middle blocks 33B is adjacent to one of the second small block pieces (37b) provided in the first middle blocks 33A with the middle longitudinal sipe 30 therebetween.

With such an arrangement of the small block pieces 37, the second small block pieces (37b) support the first small block pieces (37a) so as to suppress collapse of the first small block pieces (37a) in the tire axial direction, therefore, excessive deformation of the land region is suppressed, thereby, excellent steering stability on a dry road surface is obtained.

In a more preferred embodiment, it is preferred that side walls of the small block pieces 37 on sides of the main grooves are recessed more than side walls of the large block pieces. Thereby, it is possible that snow is firmly pressed together in the main grooves during running on snow, therefore, large snow shearing force is obtained.

As shown in FIG. 8, each of the middle lateral narrow groove pairs 35 is composed of two middle lateral narrow grooves 36 extending in the same direction, for example, and in a more preferred embodiment, it is composed of two middle lateral narrow grooves 36 extending in parallel with each other.

The middle lateral narrow groove pairs 35 include first middle lateral narrow groove pairs 35A each composed of the two middle lateral narrow grooves 36 extending straight and in parallel with each other and second middle lateral narrow groove pairs 35B each composed of the two middle lateral narrow grooves 36 extending in a bent manner while keeping parallel with each other, for example. The second middle lateral narrow groove pairs 35B increase frictional force in different directions from those of the first middle lateral narrow groove pairs 35A, therefore, excellent on-ice/on-snow performance is exerted.

Each of the middle lateral narrow grooves 36 of the second middle lateral narrow groove pairs 35B in this embodiment includes a first portion (36a) extending obliquely with respect to the tire axial direction and second portions (36b) extending from both sides of the first portion (36a) in a bent manner, for example. The second portions (36b) are arranged at smaller angles than the first portion (36a) with respect to the tire axial direction, for example. Thereby, each of the middle lateral narrow grooves 36 of the second middle lateral narrow groove pairs 35B is bent in a substantially S-shape. In the small block pieces 37 divided by the second middle lateral narrow groove pairs 35B configured as such, widths in the tire axial direction of the small block pieces 37 are likely to vary when stress in the tire circumferential direction is applied. Thereby, it is useful for discharging snow in the main grooves during running on snow.

In order to further exert the effects described above, in each of the middle blocks 33, the first middle lateral narrow groove pair 35A in this embodiment is provided at a center portion in the tire circumferential direction of the middle block 33. In each of the middle blocks 33, the second middle lateral narrow groove pairs 35B are provided on both sides in the tire circumferential direction of the first middle lateral narrow groove pair 35A, for example.

In a preferred embodiment, in each of the first middle blocks 33A, the first portions (36a) of the middle lateral narrow grooves 36 of the second middle lateral narrow groove pairs 35B arranged on one side in the tire circumferential direction are inclined in the opposite direction to the first portions (36a) of the middle lateral narrow grooves 36 of the second middle lateral narrow groove pairs 35B arranged on the other side in the tire circumferential direction. On the other hand, as shown in FIG. 7, in each of the second middle blocks 33B, the first portions (36a) of the middle lateral narrow grooves 36 of the second middle lateral narrow groove pairs 35B arranged on one side and the other side in the tire circumferential direction are inclined in the same direction.

Due to the arrangement of the middle lateral narrow groove pairs 35 as described above, the first middle blocks 33A and the second middle blocks 33B are likely to deform in different shapes from each other. Thereby, frictional force is exerted in multiple directions by edges of the middle lateral narrow groove pairs 35 and also it is helpful to suppress clogging of snow in the middle lateral grooves 32.

It is preferred that the middle lateral narrow grooves 36 of at least one of the middle lateral narrow groove pairs 35 are connected with the middle longitudinal sipe 30 at both sides in the tire circumferential direction of one of the first apex portions (30a) or one of the second apex portions (30b) of the middle longitudinal sipe 30. More specifically, one of the middle lateral narrow grooves 36 of one middle lateral narrow groove pair 35 is connected with the middle longitudinal sipe 30 on the one side in the tire circumferential direction of a vertex of one of the first apex portions (30a) or one of the second apex portions (30b) and the other one of the middle lateral narrow grooves 36 is connected with the middle longitudinal sipe 30 on the other side in the tire circumferential direction of the vertex of the one of the first apex portions (30a) or the one of the second apex portions (30b).

It is preferred that at least one of the middle lateral narrow grooves 36 provided in the first middle blocks 33A is smoothly connected with one of the middle lateral narrow grooves 36 provided in the second middle blocks 33B with the middle longitudinal sipe 30 therebetween. A plurality of the middle lateral narrow grooves 36 are smoothly connected, thus, the land region deforms appropriately, therefore, it is easy for each of edges thereof to uniformly contact with the ground, thereby, the on-ice/on-snow performance is further improved.

In a preferred embodiment, each of the middle lateral narrow grooves 36 of the first middle lateral narrow groove pairs 35A is smoothly connected with one of the middle lateral narrow grooves 36 of the second middle lateral narrow groove pairs 35B with the middle longitudinal sipe 30 therebetween.

In order to further exert the effects described above, more than half of the plurality of the middle lateral narrow grooves 36 provided in one first middle block 33A in this embodiment are smoothly connected with the middle lateral narrow grooves provided in the second middle blocks 33B.

It is preferred that at least one of the middle lateral narrow grooves 36 is connected with one of the middle lateral grooves 32. Such an arrangement of the middle lateral narrow grooves 36 can provide high frictional force along with edges of the middle lateral grooves 32. Further, by such an arrangement of the middle lateral narrow grooves 36, snow in the middle lateral grooves 32 is easily discharged by movement of the small block pieces 37, therefore, it is possible that decrease in the on-ice/on-snow performance due to clogging of snow is suppressed.

As shown in FIG. 8, a minimum distance L5 between edges of the two middle lateral narrow grooves 36 is preferably not less than 2.0 mm, more preferably not less than 2.5 mm, and preferably not more than 5.0 mm, more preferably not more than 4.5 mm. Thereby, the two middle lateral narrow grooves 36 are moderately spaced apart from each other, therefore, it is possible that occurrence of the bareness and the like during vulcanization molding is suppressed. Further, the middle lateral narrow groove pairs 35 configured as such secure widths of the large block pieces 38 appropriately, therefore, it is possible that chipping and the uneven wear of the blocks are suppressed.

The middle lateral narrow grooves 36 have widths not ore than 3 mm, preferably not more than 2.5 mm, for example. The middle lateral narrow grooves 36 may be configured as sipes, for example.

Figure 9:
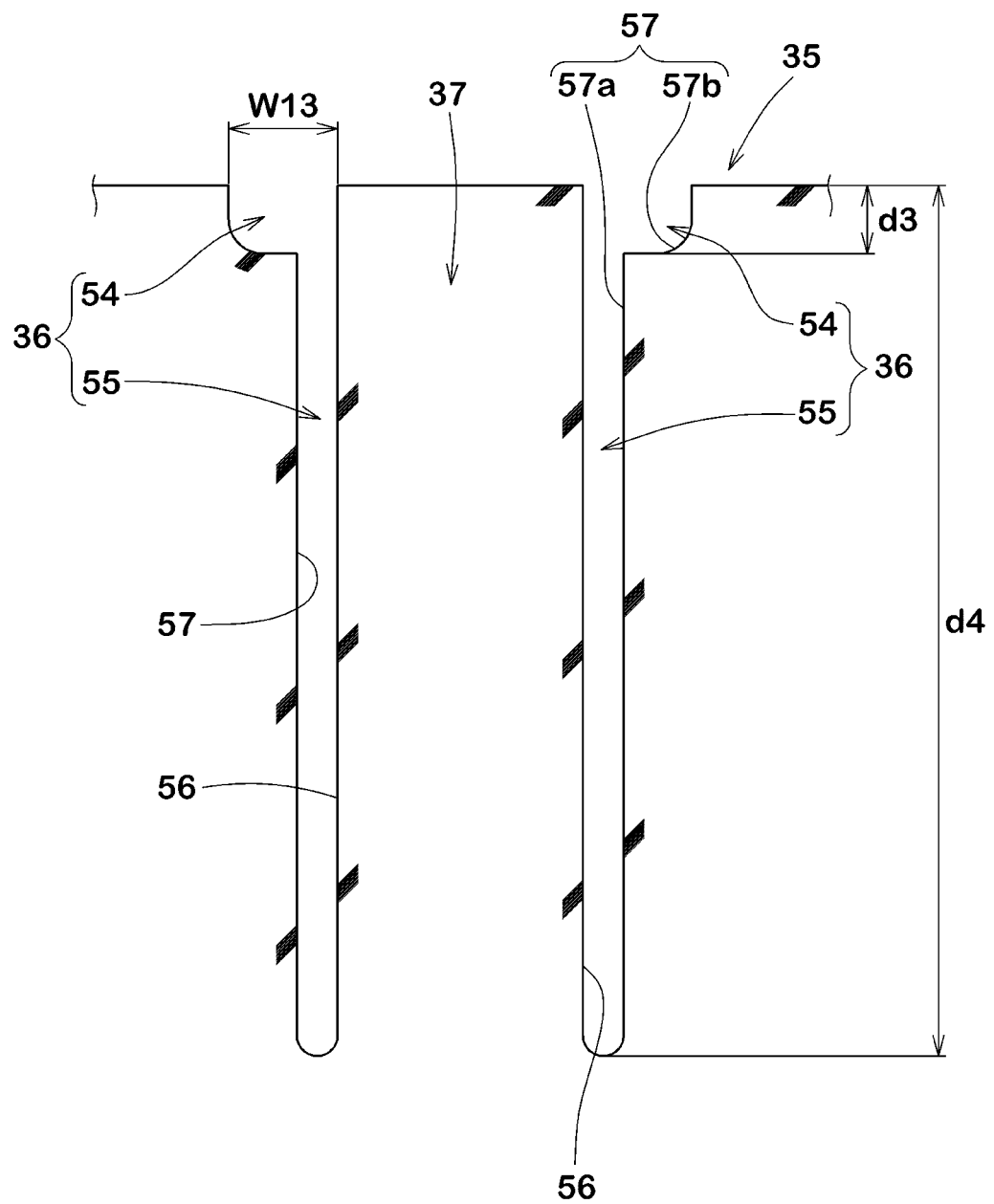
FIG. 9 is a cross-sectional view taken along B-B line of FIG. 8.

FIG. 9 is a cross-sectional view of one of the middle lateral narrow groove pairs 35 taken along B-B line of FIG. 8. As shown in FIG. 9, in the cross section, at least one, preferably each, of the middle lateral narrow grooves 36 includes an outer portion 54 disposed on a side of the ground contacting surface and an inner portion 55 disposed on a radially inner side of the outer portion 54.

The outer portion 54 has an opening width W13 in a range of from 1.5 to 2.5 mm, for example. The outer portion 54 has a depth (d3) in a range of from 0.5 to 1.5 mm, for example. It is preferred that the inner portion 55 extends with a constant width of less than 1.5 mm, for example. The outer portions 54 and the inner portions 55 configured as such can provide large frictional force by edges thereof while maintaining rigidity of the middle blocks 33. Note that the middle lateral narrow grooves 36 are not limited to such an embodiment, and may be configured to extend with a constant width from the ground contacting surface to bottom portions thereof, for example.

At least one, preferably each, of the middle lateral narrow grooves 36 in this embodiment has a first wall surface 56 and a second wall surface 57, for example. The first wall surface 56 extends straight from the bottom of the middle lateral narrow groove 36 to the ground contacting surface in the cross section. The second wall surface 57 includes a first portion (57a) extending straight in the tire radial direction to form the inner portion 55 and a second portion (57b) connected with a radially outer end of the first portion (57a) and extending radially outwardly with an increasing groove width so as to form the outer portion 54.

In a preferred embodiment, the first wall surfaces 56 of the middle lateral narrow grooves 36 in one middle lateral narrow groove pair 35 are arranged on each side of the small block piece 37 arranged therebetween. Thereby, side surfaces of the small block pieces 37 are formed in a planar shape, therefore, it is possible that durability of the small block pieces 37 is improved.

It is preferred that each of the middle lateral narrow grooves 36 has a depth (d4) in a range of from 0.55 to 0.65 times those of the shoulder main grooves 4, for example. In a more preferred embodiment, the middle lateral narrow grooves 36 have the same depths as that of the middle longitudinal sipe 30. The middle lateral narrow grooves 36 configured as such can improve the steering stability on a dry road surface and the on-ice/on-snow performance in a good balance.

Figure 10:
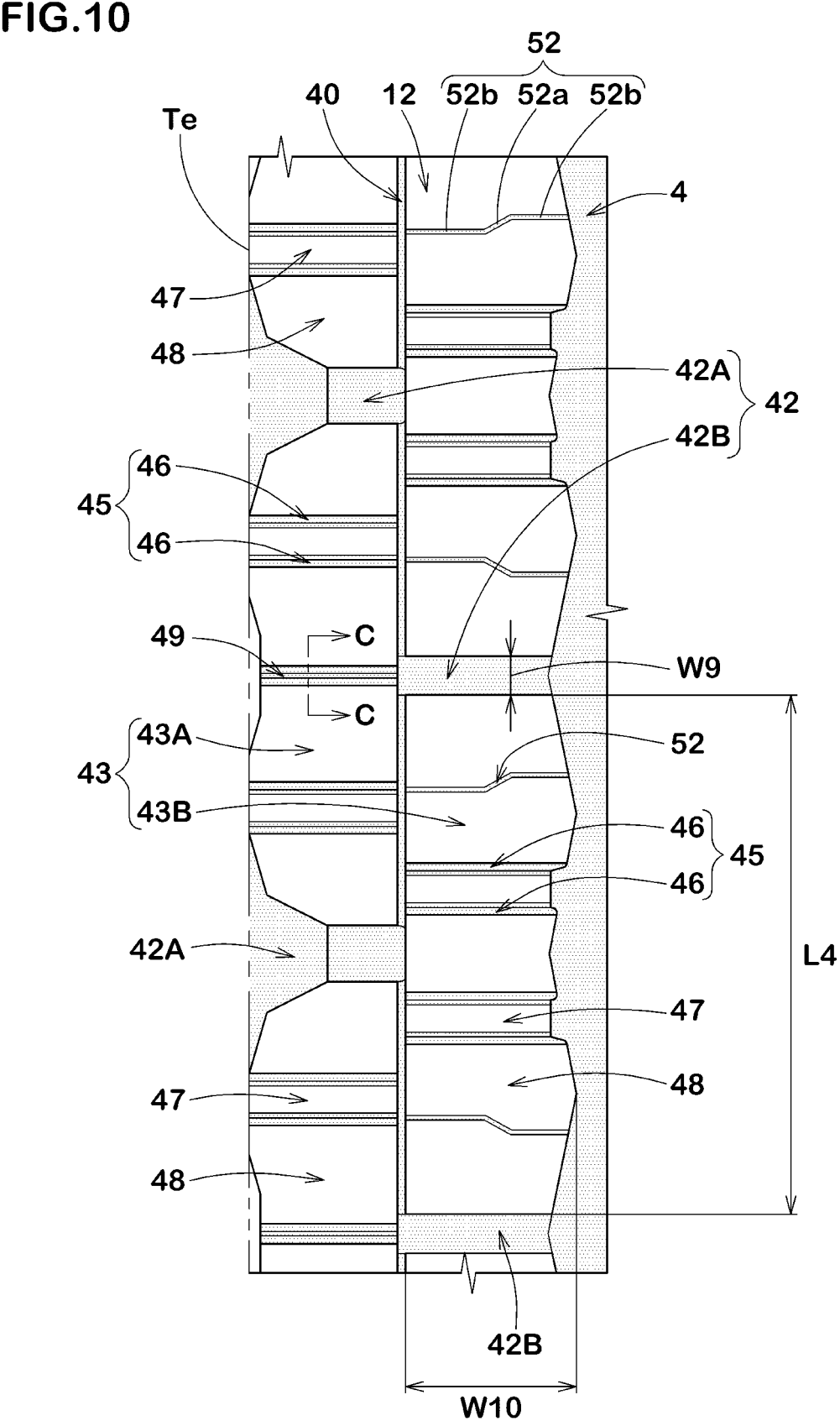
FIG. 10 is an enlarged view of one of shoulder land regions of FIG. 1.

FIG. 10 is an enlarged view of one of the shoulder land regions 12. In FIG. 10, grooves and sipes are colored in light gray for ease of understanding of the invention. As shown in FIG. 10, each of the shoulder land regions 12 is provided with a shoulder longitudinal sipe 40 extending straight.

It is preferred that the shoulder longitudinal sipe 40 has a smaller depth than that of the crown longitudinal sipe 15, for example. The shoulder longitudinal sipe 40 in this embodiment has a depth in a range of from 0.90 to 0.98 times the depth of the crown longitudinal sipe 15, for example. The shoulder longitudinal sipe 40 configured as such enable uniform progress of wear of the crown land region 10 and the shoulder land regions 12.

Each of the shoulder land regions 12 is provided with a plurality of shoulder lateral grooves 42 extending from one of the shoulder main grooves 4 or one of the tread edges (Te), for example. It is preferred that the shoulder lateral grooves 42 in this embodiment are provided every 1.5 to 2.5 pitches of the shoulder main grooves 4, for example, and particularly every two pitches in this embodiment. The shoulder lateral grooves 42 include a plurality of first shoulder lateral grooves 42A and a plurality of second shoulder lateral grooves 42B, for example. It is preferred that the first shoulder lateral grooves 42A and the second shoulder lateral grooves 42B are misaligned in the tire circumferential direction, for example.

The first shoulder lateral grooves 42A extend from the tread edge (Te) toward the shoulder main groove 4 and terminate within the shoulder land region 12, for example. The second shoulder lateral grooves 42B extend from the shoulder main groove 4 toward the tread edge (Te) and terminate within the shoulder land region 12, for example. Note that the shoulder longitudinal sipe 40 in this embodiment includes segments each extending between one of the first shoulder lateral grooves 42A and one of the second shoulder lateral grooves 42B adjacent thereto.

It is preferred that each of the first shoulder lateral grooves 42A has a groove width gradually increasing toward the tread edge (Te), for example. It is preferred that each of the first shoulder lateral grooves 42A has a groove depth gradually increasing toward the tread edge (Te), for example. The first shoulder lateral grooves 42A configured as such are helpful for guiding water in the grooves toward the tread edges (Te) during on a wet road surface.

It is preferred that each of the second shoulder lateral grooves 42B extends with a constant groove width, for example. It is preferred that each of the second shoulder lateral grooves 42B has a groove width W9 in a range of from 0.75 to 0.85 times that of each of the middle lateral grooves 32, for example. Further, it is preferred that each of the second shoulder lateral grooves 42B has a groove depth in a range of from 0.85 to 0.95 times that of each of the middle lateral grooves 32.

Each of the shoulder land regions 12 includes shoulder blocks 43 divided by the shoulder longitudinal sipe 40 and the shoulder lateral grooves 42, for example. The shoulder blocks 43 include first shoulder blocks 43A and second shoulder blocks 43B, for example. Each of the first shoulder blocks 43A is defined by the shoulder longitudinal sipe 40 and a pair of the first shoulder lateral grooves 42A adjacent to each other. Each of the second shoulder blocks 43B is defined by the shoulder longitudinal sipe 40 and a pair of the second shoulder lateral grooves 42B adjacent to each other.

Each of the shoulder blocks 43 has a longitudinally elongated shape in which a length L4 thereof in the tire circumferential direction is larger than a width W10 thereof in the tire axial direction, for example. It is preferred that the width W10 of the shoulder block 43 in the tire axial direction is in a range of from 8% to 12% of the tread width TW, for example. It is preferred that the length L4 of the shoulder block 43 in the tire circumferential direction is in a range of from 2.5 to 3.5 times the width W10, for example. The shoulder blocks 43 configured as such have rigidity in a good balance in the tire circumferential direction and in the tire axial direction, therefore, it is possible that chipping of the blocks and the uneven wear are effectively suppressed.

It is preferred that each of the shoulder blocks 43 is provided with a plurality of shoulder lateral narrow groove pairs 45. Each of the shoulder lateral narrow groove pairs 45 is composed of two shoulder lateral narrow grooves 46 completely crossing the entire block width. The shoulder lateral narrow grooves 46 in a cross section thereof have substantially the same configuration as the crown lateral narrow grooves 21, and the explanation thereof is omitted here.

Each of the shoulder blocks 43 in this embodiment is provided with two shoulder lateral narrow groove pairs 45. Thereby, each of the shoulder blocks 43 is divided into small block pieces 47 and large block pieces 48 each having a larger width in the tire circumferential direction than the small block pieces 47. The shoulder blocks 43 configured as such suppress excessive deformation like the crown blocks 18.

At least one, preferably each, of the first shoulder blocks 43A is provided with a wide lateral narrow groove 49 having a larger opening width at the ground contacting surface than the shoulder lateral narrow grooves 46 between the two shoulder lateral narrow groove pairs 45.

Figure 11:
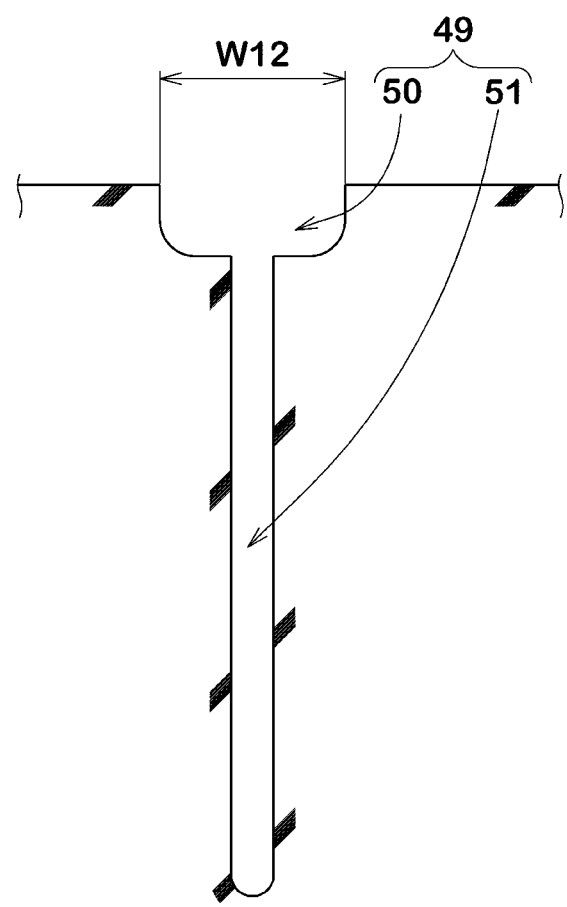
FIG. 11 is a cross-sectional view taken along C-C line of FIG. 10.

FIG. 11 is a cross-sectional view of one of the wide lateral narrow grooves 49 taken along C-C line of FIG. 10. As shown in FIG. 11, each of the wide lateral narrow grooves 49 includes an outer portion 50 having an opening width W12 in a range of from 2.0 to 3.0 mm and arranged on a side of the ground contacting surface and an inner portion 51 arranged on a radially inner side of the outer portion 50 and extending with a constant width of less than 1.5 mm, for example. The wide lateral narrow grooves 49 configured as such can provide frictional force by edges thereof while maintaining rigidity of the first shoulder blocks 43A.

As shown in FIG. 10, at least one, preferably each, of the second shoulder blocks 43B is provided with shoulder sipes 52 each completely crossing the entire width of the block between one of the second shoulder lateral grooves 42B and its adjacent one of the shoulder lateral narrow grooves 46. Each of the shoulder sipes 52 in this embodiment includes, for example, a first portion (52a) inclined with respect to the tire axial direction and second portions (52b) extending in the tire axial direction from both ends of the first portion (52a). The shoulder sipes 52 configured as such are useful for further improving the on-ice/on-snow performance.

While detailed description has been made of the tire as an especially preferred embodiment of the present invention, the present invention can be embodied in various forms without being limited to the illustrated embodiment.

Working Example (Example)

Figure 12:
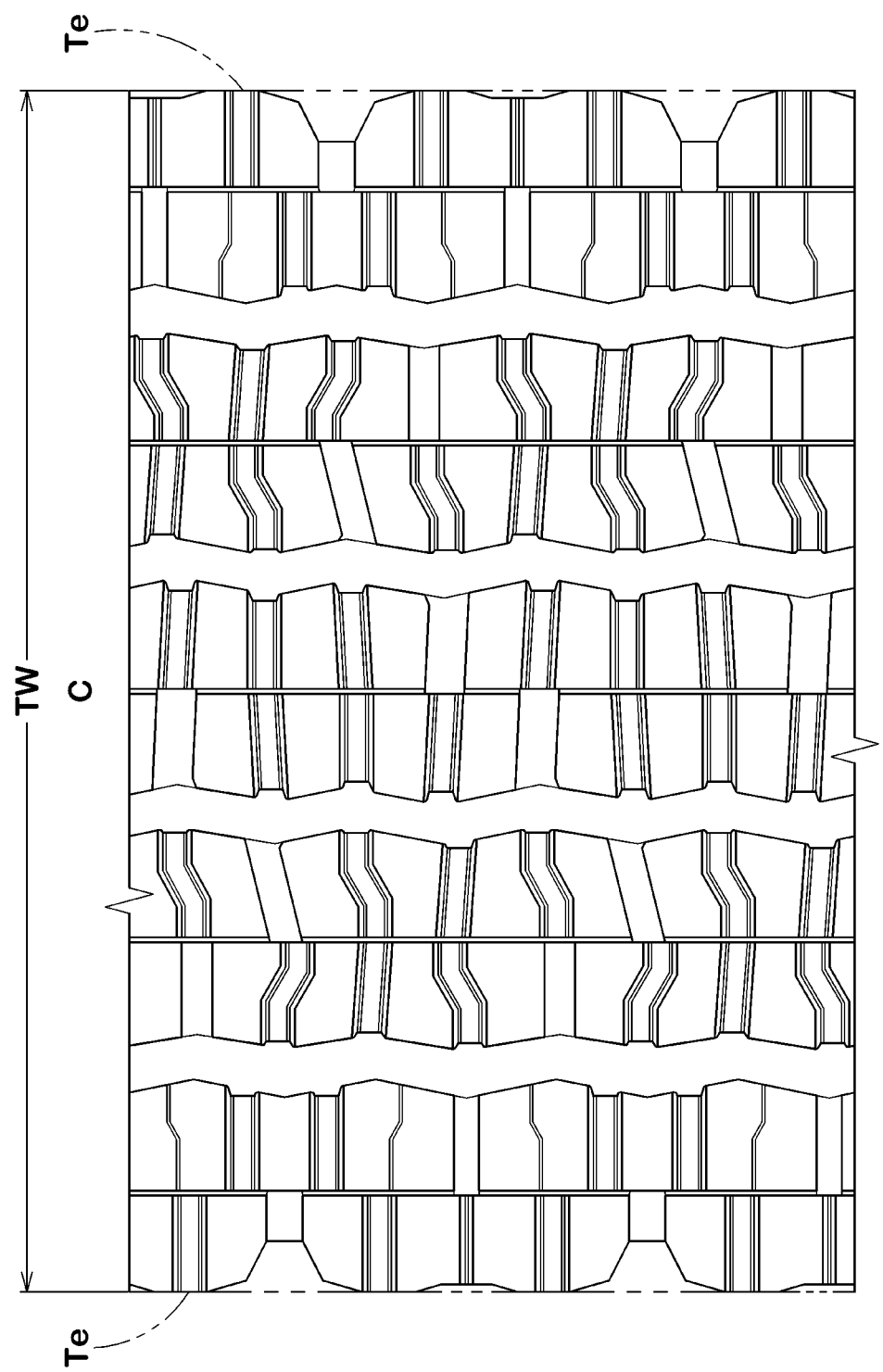
FIG. 12 is a development view of a tread portion of a tire as Reference.

Tires for heavy duty of size 11R22.5 having the basic tread pattern shown in FIG. 1 were made by way of test according to the specifications listed in Table 1. As a reference, as shown in FIG. 12, a tire provided with the crown longitudinal sipe and the middle longitudinal sipes each extending straight was made by way of test. Each of the test tires was tested for the on-snow performance, the on-ice performance, and durability of the crown land region. Common specifications and the test methods of each of the test tires are as follows.

Tire rim: 7.50×22.5
Tire pressure: 800 kPa
Test car: 10-ton truck (2WD-car) loaded with 5-ton load
Tire mounting position: all wheels <On-Ice Performance and On-Snow Performance>

The time required for running 200 meters on S-shaped roads, composed of continuous curves with curvature radius of 30 meters, each covered with ice or with compressed snow was measured respectively. The results are indicated by an index based on Reference being 100, wherein the smaller the numerical value, the better the on-ice performance and the on-snow performance.

<Durability of Crown Land Region>

The number of damage such as chipping or the uneven wear of the crown land region when the crown land region of each of the test tires mounted on the test car was worn by 40% was visually counted and evaluated in 4 grades of A to D as shown below.

A: no damages occurred in the crown land region.
B: number of the damage in the crown land region is in a range of from 1 to 5.
C: number of damages in the crown land region is in a range of from 6 to 10.
D: number of damages in the crown land region is not less than 11.

The test results are shown in Table 1.

TABLE 1

|  | Ref. | Ex. 1 | Ex. 2 | Ex. 3 | Ex. 4 | Ex. 5 | Ex. 6 | Ex. 7 |
| --- | --- | --- | --- | --- | --- | --- | --- | --- |
| Figure showing Tread pattern | FIG. 12 | FIG. 1 | FIG. 1 | FIG. 1 | FIG. 1 | FIG. 1 | FIG. 1 | FIG. 1 |
| Difference between Maximum inclination angle and Minimum inclination angle of Crown main groove | 2.5 | 2.5 | 1.5 | 3.5 | 0.5 | 2.5 | 2.5 | 2.5 |
| Bending angles θ1 of Crown longitudinal sipe [degree] | 160 | 160 | 165 | 155 | 160 | 160 | 120 | 160 |
| Angles θ2 of Crown lateral grooves [degree] | 3.0 | 3.0 | 2.0 | 4.0 | 3.0 | 6.0 | 3.0 | 3.0 |
| Minimum distance L2 between edges of two Crown lateral narrow grooves [mm] | 3.5 | 3.5 | 2.5 | 4 | 3.5 | 3.5 | 3.5 | 1.5 |
| On-ice performance [index] | 100 | 94 | 96 | 96 | 97 | 95 | 94 | 94 |
| On-snow performance [index] | 100 | 93 | 95 | 96 | 98 | 96 | 92 | 94 |
| Durability of Crown land region | C | A | A | B | A | D | D | A |

|  | Ex. 8 | Ex. 9 | Ex. 10 | Ex. 11 | Ex. 12 | Ex. 13 | Ex. 14 | Ex. 15 |
| --- | --- | --- | --- | --- | --- | --- | --- | --- |
| Figure showing Tread pattern | FIG. 1 | FIG. 1 | FIG. 1 | FIG. 1 | FIG. 1 | FIG. 1 | FIG. 1 | FIG. 1 |
| Difference between Maximum inclination angle and Minimum inclination angle of Crown main groove | 1.0 | 2.0 | 3.0 | 4.0 | 2.5 | 2.5 | 2.5 | 2.5 |
| Bending angles θ1 of Crown longitudinal sipe [degree] | 160 | 160 | 160 | 160 | 150 | 155 | 165 | 170 |
| Angles θ2 of Crown lateral grooves [degree] | 3.0 | 3.0 | 3.0 | 3.0 | 3.0 | 3.0 | 3.0 | 3.0 |
| Minimum distance L2 between edges of two Crown lateral narrow grooves [mm] | 3.5 | 3.5 | 3.5 | 3.5 | 3.5 | 3.5 | 3.5 | 3.5 |
| On-ice performance [index] | 96 | 95 | 94 | 94 | 94 | 94 | 95 | 96 |
| On-snow performance [index] | 95 | 95 | 94 | 95 | 93 | 94 | 95 | 97 |
| Durability of Crown land region | A | A | B | B | C | B | A | A |

|  | Ex. 16 | Ex. 17 | Ex. 18 | Ex. 19 | Ex. 20 | Ex. 21 | Ex. 22 | Ex. 23 |
| --- | --- | --- | --- | --- | --- | --- | --- | --- |
| Figure showing Tread pattern | FIG. 1 | FIG. 1 | FIG. 1 | FIG. 1 | FIG. 1 | FIG. 1 | FIG. 1 | FIG. 1 |
| Difference between Maximum inclination angle and Minimum inclination angle of Crown main groove | 2.5 | 2.5 | 2.5 | 2.5 | 2.5 | 2.5 | 2.5 | 2.5 |
| Bending angles θ1 of Crown longitudinal sipe [degree] | 160 | 160 | 160 | 160 | 160 | 160 | 160 | 160 |
| Angles θ2 of Crown lateral grooves [degree] | 1.0 | 2.0 | 4.0 | 5.0 | 3.0 | 3.0 | 3.0 | 3.0 |
| Minimum distance L2 between edges of two Crown lateral narrow grooves [mm] | 3.5 | 3.5 | 3.5 | 3.5 | 2.0 | 2.5 | 4.5 | 5.0 |
| On-ice performance [index] | 96 | 95 | 95 | 94 | 95 | 95 | 95 | 96 |
| On-snow performance [index] | 95 | 95 | 94 | 93 | 94 | 94 | 95 | 95 |
| Durability of Crown land region | A | A | A | B | A | A | A | B |

From the test results, it was confirmed that the tires as Examples exerted excellent on-ice/on-snow performance. Further, it was confirmed that the durability of the crown land regions was improved in the tires as the Examples.

Tires for heavy duty of size 11R22.5 having the basic tread pattern shown in FIG. 1 were made by way of test according to the specifications listed in Table 2. As a reference, as shown in FIG. 12, a tire provided with the middle longitudinal sipes and the crown longitudinal sipe each extending straight was made by way of test. Each of the test tires was tested for the on-snow performance, the on-ice performance, and durability of the middle land regions. Common specifications and the test methods of each of the test tires are as follows.

Tire rim: 7.50×22.5
Tire pressure: 800 kPa
Test car: 10-ton truck (2WD-car) loaded with 5-ton load
Tire mounting position: all wheels <On-Ice Performance and On-Snow Performance>

The time required for running 200 meters on S-shaped roads, composed of continuous curves with curvature radius of 30 meters, each covered with ice or with compressed snow was measured respectively. The results are indicated by an index based on Reference being 100, wherein the smaller the numerical value, the better the on-ice performance and the on-snow performance.

<Durability of Middle Land Regions>

The number of damage such as chipping or the uneven wear of the middle land regions when the middle land regions of each of the test tires mounted on the test car was worn by 40% was visually counted and evaluated in 4 grades of A to D as shown below.

A: no damages occurred in the crown land region.
B: number of the damage in the crown land region is in a range of from 1 to 5.
C: number of damages in the crown land region is in a range of from 6 to 10.
D: number of damages in the crown land region is not less than 11.

The test results are shown in Table 2.

TABLE 2

|  | Ref. | Ex. 1 | Ex. 2 | Ex. 3 | Ex. 4 | Ex. 5 | Ex. 6 | Ex. 7 |
| --- | --- | --- | --- | --- | --- | --- | --- | --- |
| Figure showing Tread pattern | FIG. 12 | FIG. 1 | FIG. 1 | FIG. 1 | FIG. 1 | FIG. 1 | FIG. 1 | FIG. 1 |
| Difference between Maximum inclination angle and Minimum inclination angle of Shoulder main groove | 2.5 | 2.5 | 1.5 | 3.5 | 0.5 | 2.5 | 2.5 | 2.5 |

TABLE 2-continued

|  |  |  |  |  |  |  |  |  |
|---|---|---|---|---|---|---|---|---|
| Bending angles θ3 of Middle longitudinal sipe [degree] | 150 | 150 | 155 | 145 | 150 | 150 | 120 | 150 |
| Angles θ4 of Second Middle lateral grooves [degree] | 15.0 | 15.0 | 10.0 | 20.0 | 15.0 | 25.0 | 15.0 | 15.0 |
| Minimum distance L5 between edges of two Middle lateral narrow grooves [mm] | 3.5 | 3.5 | 2.5 | 4 | 3.5 | 3.5 | 3.5 | 1.5 |
| On-ice performance [index] | 100 | 95 | 97 | 96 | 96 | 96 | 94 | 95 |
| On-snow performance [index] | 100 | 94 | 96 | 96 | 98 | 97 | 94 | 94 |
| Durability of Middle land region | C | A | A | B | A | D | D | A |

|  | Ex. 8 | Ex. 9 | Ex. 10 | Ex. 11 | Ex. 12 | Ex. 13 | Ex. 14 | Ex. 15 |
|---|---|---|---|---|---|---|---|---|
| Figure showing Tread pattern | FIG. 1 | FIG. 1 | FIG. 1 | FIG. 1 | FIG. 1 | FIG. 1 | FIG. 1 | FIG. 1 |
| Difference between Maximum inclination angle and Minimum inclination angle of Shoulder main groove | 1.0 | 2.0 | 3.0 | 4.0 | 2.5 | 2.5 | 2.5 | 2.5 |
| Bending angles θ3 of Middle longitudinal sipe [degree] | 150 | 150 | 150 | 150 | 140 | 145 | 155 | 160 |
| Angles θ4 of Second Middle lateral grooves [degree] | 15.0 | 15.0 | 15.0 | 15.0 | 15.0 | 15.0 | 15.0 | 15.0 |
| Minimum distance L5 between edges of two Middle lateral narrow grooves [mm] | 3.5 | 3.5 | 3.5 | 3.5 | 3.5 | 3.5 | 3.5 | 3.5 |
| On-ice performance [index] | 97 | 95 | 95 | 95 | 95 | 95 | 95 | 97 |
| On-snow performance [index] | 96 | 96 | 94 | 96 | 94 | 94 | 95 | 98 |
| Durability of Middle land region | A | A | B | B | C | B | A | A |

|  | Ex. 16 | Ex. 17 | Ex. 18 | Ex. 19 | Ex. 20 | Ex. 21 | Ex. 22 | Ex. 23 |
|---|---|---|---|---|---|---|---|---|
| Figure showing Tread pattern | FIG. 1 | FIG. 1 | FIG. 1 | FIG. 1 | FIG. 1 | FIG. 1 | FIG. 1 | FIG. 1 |
| Difference between Maximum inclination angle and Minimum inclination angle of Shoulder main groove | 2.5 | 2.5 | 2.5 | 2.5 | 2.5 | 2.5 | 2.5 | 2.5 |
| Bending angles θ3 of Middle longitudinal sipe [degree] | 150 | 150 | 150 | 150 | 150 | 150 | 150 | 150 |
| Angles θ4 of Second Middle lateral grooves [degree] | 10.0 | 12.0 | 18.0 | 20.0 | 15.0 | 15.0 | 15.0 | 15.0 |
| Minimum distance L5 between edges of two Middle lateral narrow grooves [mm] | 3.5 | 3.5 | 3.5 | 3.5 | 2.0 | 2.5 | 4.5 | 5.0 |
| On-ice performance [index] | 97 | 96 | 95 | 95 | 96 | 95 | 96 | 96 |
| On-snow performance [index] | 96 | 95 | 94 | 94 | 95 | 94 | 95 | 95 |
| Durability of Middle land region | A | A | A | B | A | A | A | B |

From the test results, it was confirmed that the tires as Examples exerted excellent on-ice/on-snow performance. Further, it was confirmed that the durability of the middle land regions was improved in the tires as the Examples.

The invention claimed is:

1. A tire comprising a tread portion comprising two main grooves extending continuously in a tire circumferential direction in zigzag shapes and a land region defined between the two main grooves, wherein
   phases of the zigzag shapes of the two main grooves are aligned with each other such that peak portions of the zigzag shape of the two main grooves are aligned with each other in a width-wise direction of the tire,
   the land region is provided with a longitudinal sipe extending in the tire circumferential direction in a zigzag shape,
   a phase of the zigzag of the longitudinal sipe is opposite to the phases of the zigzags of the two main grooves such that the peak portions of the zigzag shapes of the two main grooves are positioned at half of the pitch of the zigzag shape of the longitudinal sipe in the longitudinal direction of the tire, the pitch of the zigzag shape of the longitudinal sipe being defined by two peak portions of the zigzag shape of the longitudinal sipe,
   the longitudinal sipe has an opening width of less than 1.5 mm at a ground contacting surface of the tire,
   the land region is provided with:
      a plurality of first lateral grooves extending from a first main groove among the two main grooves and terminating within the land region, the first main groove being arranged on a first side of the land region; and
      a plurality of second lateral grooves extending from a second main groove among the two main grooves and terminating within the land region, the second main groove being arranged on a second side of the land region, opposite to the first side of the land region;
   the longitudinal sipe extends between the first lateral grooves and the second lateral grooves,
   the land region includes first blocks divided by the longitudinal sipe and the plurality of the first lateral grooves and second blocks divided by the longitudinal sipe and the plurality of the second lateral grooves, and
   each of the first blocks and the second blocks is provided with only three lateral narrow groove pairs, each lateral narrow groove pair composed of two lateral narrow grooves completely crossing the entire block.

2. The tire according to claim 1, wherein
   the longitudinal sipe includes first apex portions convex toward one of the main grooves and second apex portions convex toward the other one of main grooves, and
   the lateral narrow grooves of at least one of the lateral narrow groove pairs are connected with the longitudinal sipe at both sides in the tire circumferential direction of one of the first apex portions or one of the second apex portions.

3. The tire according to claim 1, wherein
   a minimum distance between edges of the two lateral narrow grooves is in a range of from 2.0 to 5.0 mm.

4. The tire according to claim 1, wherein
   each of the lateral narrow grooves includes, in a cross-sectional view thereof, an outer portion disposed on a side of the ground contacting surface and an inner portion disposed on an inner side in a tire radial direction of the outer portion and extending with a constant width of less than 1.5 mm.

5. The tire according to claim 1, wherein
   each of the lateral narrow grooves has a depth in a range of from 0.60 to 0.70 times a depth of each of the main grooves.

6. The tire according to claim 1, wherein
the lateral narrow grooves have the same depths as that of the longitudinal sipe.

7. The tire according to claim 1, wherein
bending angles of the zigzag of the longitudinal sipe are smaller than bending angles of the zigzags of the main grooves.

8. The tire according to claim 1, wherein
the main grooves include a shoulder main groove arranged closest to a tread edge and at least one crown main groove arranged on a side of a tire equator of the shoulder main groove,
the land region includes a middle land region defined between the shoulder main groove and the at least one crown main groove, and
the longitudinal sipe includes a middle longitudinal sipe provided in the middle land region.

9. The tire according to claim 8, wherein
the middle longitudinal sipe has a depth in a range of from 0.55 to 0.65 times a depth of the shoulder main groove.

10. The tire according to claim 1, wherein
each of the first blocks and the second blocks includes a plurality of small block pieces each defined between two lateral narrow grooves of one of the lateral narrow groove pairs,
the small block pieces include a first small block piece provided at a center portion in the tire circumferential direction of the first block or second block, and second small block pieces having greater lengths in the tire axial direction than that of the first small block piece, and
each of the first small block pieces provided in the first blocks is adjacent to one of the second small block pieces provided in the second blocks with the longitudinal sipe therebetween.

11. The tire according to claim 10, wherein
each of the first small block pieces provided in the first blocks is adjacent to one of the second small block pieces provided in the second blocks such that the first small block piece and the second small block piece face each other in the tire axial direction with the longitudinal sipe therebetween so as to overlap at least partially with each other in the tire circumferential direction.

12. The tire according to claim 1, wherein
at least one of the lateral narrow grooves provided in the first blocks is smoothly connected with one of the lateral narrow grooves provided the second blocks with the longitudinal sipe therebetween.

13. The tire according to claim 12, Wherein
in the pair of the at least one of the lateral narrow grooves provided in the first blocks and the one of the lateral narrow grooves provided in the second blocks which are smoothly connected with the longitudinal sipe therebetween, an opening of the at least one of the lateral narrow grooves at the longitudinal sipe and an opening of the one of the lateral narrow grooves at the longitudinal sipe overlap with each other in the tire circumferential direction.

14. The tire according to claim 1, wherein
the main grooves include a shoulder main groove arranged closest to a tread edge and a first crown main groove and a second crown main groove,
the first crown main groove arranged on one side of a tire equator and the second crown main groove is arranged on the other side of the tire equator,
the land region includes a crown land region defined between the first crown main groove and the second crown main groove, and a middle land region defined between the shoulder main groove and one of the first crown main groove and the second crown main groove arranged closer to the shoulder main groove,
the longitudinal sipe only has first inclined elements inclined to one side with respect to the tire circumferential direction and second inclined elements inclined to the other side with respect to the tire circumferential direction,
the first inclined elements and the second inclined elements are arranged alternately one by one is the tire circumferential direction,
the longitudinal sipe includes a crown longitudinal sipe provided in the crown land region and a middle longitudinal sipe provided in the middle land region, and
each of bending angles of the zigzag of the middle longitudinal sipe is smaller than each of bending angles of the zigzag of the crown longitudinal sipe.

15. The tire according to claim 14, wherein
each of the bending angles of the zigzag of the middle longitudinal sipe is 140 degrees or more and 160 degrees or less.

16. The tire according to claim 1, wherein
the main grooves include a first crown main groove arranged on a first side of a tire equator and a second crown main groove arranged on a second side of the tire equator,
the land region includes a crown land region defined between the first crown main groove and the second crown main groove, and
the longitudinal sipe includes a crown longitudinal sipe provided in the crown land region.

17. The tire according to claim 16, wherein
the first lateral grooves include first crown lateral grooves provided in the crown land region,
the second lateral grooves include second crown lateral grooves provided in the crown land region,
the first crown lateral grooves are provided at intervals in a range of from 1.5 to 2.5 pitches of the first crown main groove, and
the second crown lateral grooves are provided at intervals in a range of from 1.5 to 2.5 pitches of the second crown main groove.

18. The tire according to claim 17, wherein
each of groove depths of the first crown lateral grooves and the second crown lateral grooves is in a range of from 0.75 to 0.85 times each of groove depths of the first crown main groove and the second crown main grooves.

19. The tire according to claim 16, wherein
the main grooves include a shoulder main groove arranged between the first crown main groove and a tread edge on the first side,
the land region includes a middle land region defined between the shoulder main groove and the first crown main groove,
the first lateral grooves include first crown lateral grooves provided in the crown land region and first middle lateral grooves provided in the middle land region,
the second lateral grooves include second crown lateral grooves provided in the crown land region and second middle lateral grooves provided in the middle land region, and
each of depths of the first middle lateral grooves and the second middle lateral grooves is in a range of from 0.90 to 0.98 times each of depths of the first crown lateral grooves and the second crown lateral grooves.

20. The tire according to claim 19, wherein each of the depths of the first middle lateral grooves and the second middle lateral grooves is in a range of from 0.70 to 0.80 times a depth of the shoulder main groove.

\* \* \* \* \*